US010451952B2

(12) United States Patent
Cremer et al.

(10) Patent No.: US 10,451,952 B2
(45) Date of Patent: Oct. 22, 2019

(54) SYSTEMS AND METHODS TO TRANSFORM EVENTS AND/OR MOOD ASSOCIATED WITH PLAYING MEDIA INTO LIGHTING EFFECTS

(71) Applicant: Gracenote, Inc., Emeryville, CA (US)

(72) Inventors: Markus Kurt Cremer, Orinda, CA (US); Shashank Merchant, Emeryville, CA (US); Aneesh Vartakavi, Emeryville, CA (US)

(73) Assignee: GRACENOTE, INC., Emeryville, CA (US)

( * ) Notice: Subject to any disclaimer, the term of this patent is extended or adjusted under 35 U.S.C. 154(b) by 0 days.

(21) Appl. No.: 16/161,830

(22) Filed: Oct. 16, 2018

(65) Prior Publication Data
US 2019/0049818 A1    Feb. 14, 2019

Related U.S. Application Data

(63) Continuation of application No. 15/839,447, filed on Dec. 12, 2017, now Pat. No. 10,146,100.
(Continued)

(51) Int. Cl.
G06F 7/00         (2006.01)
G06F 17/00        (2019.01)
(Continued)

(52) U.S. Cl.
CPC .............. *G02F 1/25* (2013.01); *G02F 1/0121* (2013.01); *G06F 16/00* (2019.01); *G06F 16/783* (2019.01)

(58) Field of Classification Search
CPC ......... G06F 17/30864; G06F 17/30867; G06F 17/30067; G06F 17/30011;
(Continued)

(56) References Cited

U.S. PATENT DOCUMENTS 8,855,798 B2   10/2014   DiMaria et al.
8,996,538 B1    3/2015   Cremer et al.
(Continued)

FOREIGN PATENT DOCUMENTS

GB      2557884       7/2018
WO    20060111102     2/2006

OTHER PUBLICATIONS

Barthet et al., "Moodplay: An Interactive Mood-Based Musical Experience," published by Queen Mary University of London, 2015, 9 pages.
(Continued)

*Primary Examiner* — Minh D A
(74) *Attorney, Agent, or Firm* — Hanley, Flight & Zimmerman, LLC

(57) ABSTRACT

Example systems and methods to transform events and/or mood associated with playing media into lighting effects are disclosed herein. An example apparatus includes a content identifier to identify a first event occurring during presentation of media content at a first time. The example apparatus includes a content driven analyzer to determine a first lighting effect to be produced by a light-producing device based on the first event and instruct the light-producing device to produce the first lighting effect based on the first event during presentation of the media content. The content identifier is to identify a second media event occurring during presentation of the media content at a second time after the first time. The content driven analyzer is to instruct the light-producing device to one of maintain the first lighting effect based on the second event or produce a second lighting effect based on the second event during presentation of the media content.

20 Claims, 18 Drawing Sheets

Related U.S. Application Data

(60) Provisional application No. 62/433,018, filed on Dec. 12, 2016.

(51) Int. Cl.
*G02F 1/25* (2006.01)
*G02F 1/01* (2006.01)
*G06F 16/783* (2019.01)
*G06F 16/00* (2019.01)

(58) Field of Classification Search
CPC ......... G06F 17/30286; G06F 17/30899; G06F 3/0611; G06F 11/1435; G06Q 30/02; G06Q 10/10; H03M 7/30
See application file for complete search history.

(56) References Cited

U.S. PATENT DOCUMENTS

| | | |
|---|---|---|
| 9,106,804 B2 | 8/2015 | Roberts et al. |
| 9,213,747 B2 | 12/2015 | Cremer et al. |
| 9,380,383 B2 | 6/2016 | Brenner et al. |
| 9,510,044 B1 | 11/2016 | Pereira et al. |
| 9,753,925 B2 | 9/2017 | Cremer et al. |
| 9,788,777 B1 | 10/2017 | Knight et al. |
| 9,792,084 B2 | 10/2017 | Vartakavi et al. |
| 9,891,796 B2 | 2/2018 | DiMaria et al. |
| 9,940,973 B2 | 4/2018 | Roberts et al. |
| 10,146,100 B2 | 12/2018 | Cremer et al. |
| 2008/0320126 A1 | 12/2008 | Drucker et al. |
| 2009/0176569 A1 | 7/2009 | Eves et al. |
| 2010/0071535 A1 | 3/2010 | McKinney et al. |
| 2010/0325135 A1 | 12/2010 | Chen et al. |
| 2011/0190913 A1 | 8/2011 | Van De Sluis et al. |
| 2011/0245941 A1 | 10/2011 | De Waele et al. |
| 2012/0016208 A1 | 1/2012 | Janssen et al. |
| 2012/0129601 A1 | 5/2012 | Gronkowski et al. |
| 2013/0166042 A1 | 6/2013 | Sharma et al. |
| 2014/0178043 A1 | 6/2014 | Kritt et al. |
| 2014/0330848 A1 | 11/2014 | Chen et al. |
| 2015/0194151 A1 | 7/2015 | Jeyachandran et al. |
| 2016/0373197 A1 | 12/2016 | Brenner et al. |
| 2018/0024810 A1 | 1/2018 | Vartakavi et al. |
| 2018/0049688 A1 | 2/2018 | Knight et al. |
| 2018/0075039 A1 | 3/2018 | Chen et al. |
| 2018/0164655 A1 | 6/2018 | Cremer et al. |

OTHER PUBLICATIONS

Philips, "Hue Personal Wireless Lighting," available at https://www2.meethue.com/en-us (last accessed Jun. 28, 2018), 15 pages.

United States Patent and Trademark Office, "Notice of Allowance and Fee(s) Due," issued in connection with U.S. Appl. No. 15/839,447, dated Jul. 16, 2018, 19 pages.

United States Patent and Trademark Office, "Notice of Allowability," issued in connection with U.S. Appl. No. 15/839,447, dated Nov. 5, 2018, 9 pages.

SYSTEMS AND METHODS TO TRANSFORM EVENTS AND/OR MOOD ASSOCIATED WITH PLAYING MEDIA INTO LIGHTING EFFECTS

RELATED APPLICATION

This patent arises from a continuation of U.S. patent application Ser. No. 15/839,447, which was filed Dec. 12, 2017, and the benefit under 35 U.S.C. § 119(e) of U.S. Provisional Patent Application No. 62/433,018, which was filed on Dec. 12, 2016. U.S. patent application Ser. No. 15/839,447 and U.S. Provisional Patent Application No. 62/433,018 are hereby incorporated by reference in their entireties.

FIELD OF THE DISCLOSURE

This disclosure relates generally to lighting effects and, more particularly, to systems and methods to transform events and/or mood associated with playing media into lighting effects.

BACKGROUND

With the Internet of Things (IoT) trend, many devices in your life connect to the Internet. No longer are just computers and smartphones connected, but everything: clocks, speakers, lights, doors, doorbells, cameras, windows, window blinds, hot water heaters, appliances, cooking utensils, etc. Often, these devices can communicate with and take commands from a user and be controlled by software application. Automation, such as in the home or automobile, provides the ability to control devices, such as window shades and pet feeders, for example, using a push of a button or a voice command.

BRIEF DESCRIPTION OF THE DRAWINGS

Some examples disclosed herein are illustrated the figures of the accompanying drawings but examples disclosed herein are not limited by the figures.

Figure 1:
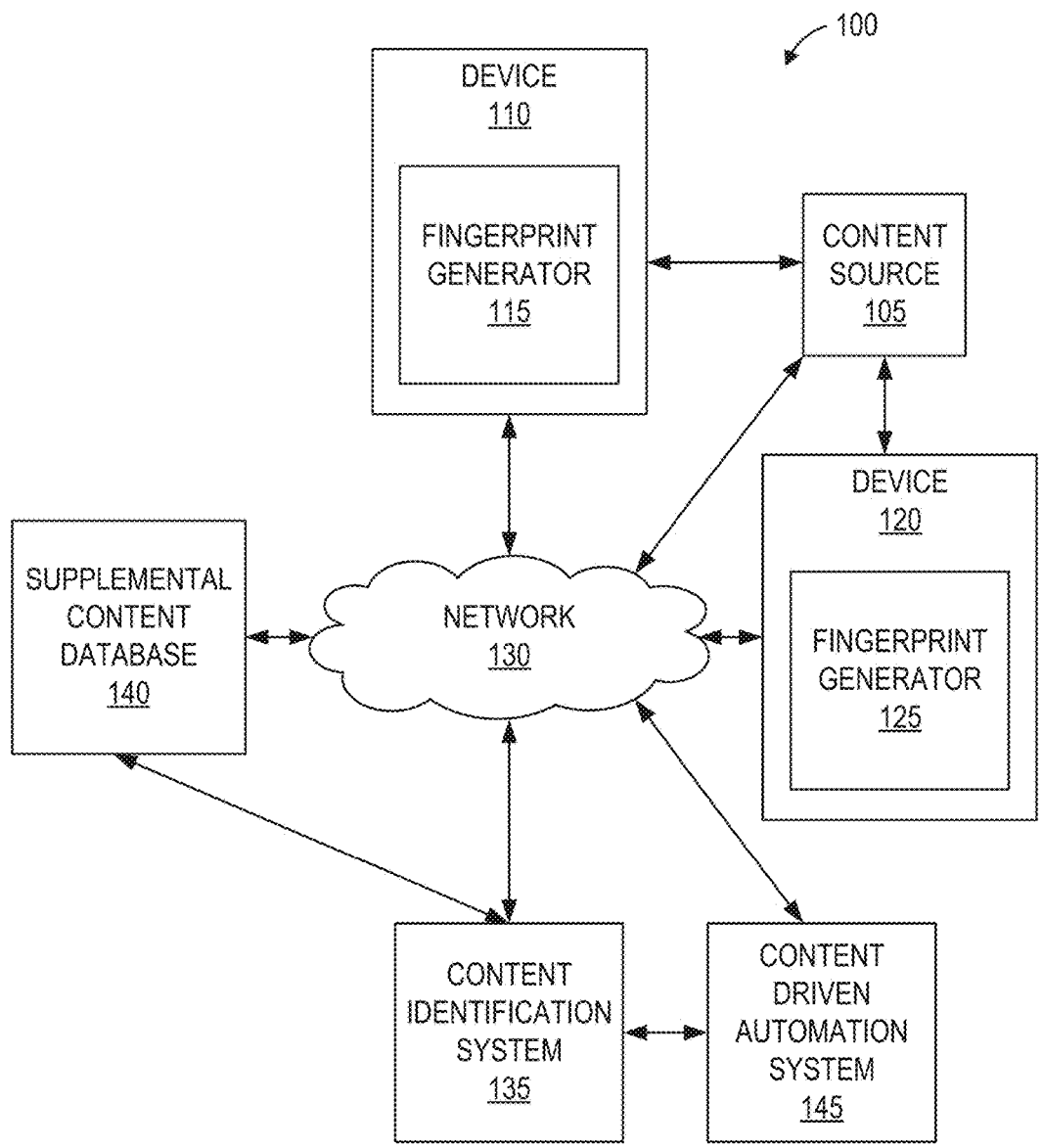
FIG. 1 is a network diagram illustrating an example network environment suitable for identifying content during playback using example digital fingerprint matching according to the teachings of this disclosure.

7-11, 13, and/or 16 to implement the example systems of FIGS. 1-6, 12A, 12B, and/or 15.

The figures are not to scale. Wherever possible, the same reference numbers will be used throughout the drawing(s) and accompanying written description to refer to the same or like parts.

DETAILED DESCRIPTION

Disclosed herein are special-purpose machines that perform or otherwise facilitate processing of playing media, including computerized variants of such special-purpose machines and improvements to such variants, and to the technologies by which such special-purpose machines become improved compared to other special-purpose machines that perform or otherwise facilitate media processing. Specifically, the present disclosure addresses systems and methods for controlling a first device during playback of content on a second device using digital fingerprinting.

Example methods (e.g., algorithms) facilitate machine-led automation, and example systems (e.g., special-purpose machines) are configured to facilitate machine-led automation during playback using digital fingerprint matching according to the teachings of this disclosure. Some examples disclosed herein configure a machine to perform machine-leading of one or more changes in automation state, which may consequently result in machine-leading of one or more changes in one device's state during playback of content on another device. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In this disclosure, for purposes of explanation, numerous specific details are set forth to provide a thorough understanding of the examples disclosed herein. It will be evident to one skilled in the art, however, that the present subject matter may be practiced without these specific details.

A. Introduction

Example methods and systems for providing automation during playback of content identified via fingerprint matching, such as via the matching of color-based fingerprints (e.g., values of fingerprints), are disclosed.

B. Example Network Environment

FIG. 1 is a network diagram illustrating an example network environment 100 suitable for identifying video content via digital fingerprint matching according to the teachings of this disclosure. The network environment 100 can include one or more servers that include hardware and/or software components that perform specific functions. In this example, the network environment 100 includes an example content source 105, an example device 110 having an example fingerprint generator 115, an example device 120 having an example fingerprint generator 125, an example network 130, an example content identification system 135, an example supplemental content database 140, and an example content driven automation system 145.

The network environment 100 may include the device 110 that receives video and other multimedia content from the content source 105, such as, for example, a broadcaster, web server, and so on. For example, the content source 105 may be a broadcaster, such as television station or television network, which streams or transmits media over a television channel to the device 110, and/or a web service, such as a website, that streams or transmits media over the network 130 to the device 110. The device 110 includes the fingerprint generator 115 that generates fingerprints of content received from the content source 105. In addition or instead, the network environment 100 may include the device 120 that receives video and other multimedia content from the content source 105, such as via a broadcast channel and/or over the network 130. The device 120 includes the fingerprint generator 125 that generates fingerprints of content received from the content source 105.

The device 110 and the device 120 may include, for example, television(s), set-top box(es), laptop(s) and/or other personal computer(s), tablet(s) and/or other mobile device(s), gaming device(s), and/or other device(s) capable of receiving and presenting a stream of video and/or other multimedia content to a viewer. In some examples, the device 110 and the device 120 may include a tuner configured to receive a stream of video content and play the stream of video content by processing the stream and outputting information (e.g., digital or analog) usable by a display to present the video content to a viewer or user associated with the device. The device 110 and the device 120 may also include a display or other user interface configured to display the processed stream of video content. The display may be a flat-panel screen, a plasma screen, a light emitting diode (LED) screen, a cathode ray tube (CRT), a liquid crystal display (LCD), a projector, a touch screen of a mobile device, and so on.

The network 130 may be any network that enables communication between devices, such as, for example, a wired network, a wireless network (e.g., a mobile network), and so on. The network 130 may include one or more portions that constitute a private network (e.g., a cable television network or a satellite television network), a public network (e.g., over-the-air broadcast channels or the Internet), and so on.

In some examples, the content identification system 135 communicates with the device 110 and the device 120 over the network 130. The content identification system 135 may identify content using digital fingerprint matching. The content identification system 135 may receive a fingerprint generated by the fingerprint generator 115 of the device 110. For example, the fingerprint may be derived from a frame or block of frames within video content during playback using the device 110. In some examples, the fingerprint is derived from the frame(s) before and/or after playback of the video content. The content identification system 135 may query an index of known reference fingerprints, for example, generated by a reference fingerprint generator (not shown) in order to identify the content by matching a query fingerprint with one or more reference fingerprints.

Upon identifying the content, the content identification system 135 may return a content identifier for supplemental content (e.g., metadata, event-based information, and so on) associated with the content analyzed or identified as being displayed on the device 110. The supplemental content may be provided in one or more supplemental content databases 140. In some examples, the content identification system 135 may utilize the content identifier to access supplemental content from the database 140 to perform one or more actions. In some examples, the content identification system 135 may communicate the content identifier to a requesting device enabling the requesting device to access supplemental content from the database 140 to perform one or more actions.

In some examples, using the content identifier, the device 110 and/or the device 120 may access the supplemental content from the database 140 to perform one or more actions. For example, the device 110 and/or the device 120 may access and present supplemental content from the database 140, such as, for example, listing or guide information for a broadcast channel, metadata associated with playing video content, information associated with playing video content, and so on.

In some examples, using the content identifier, the content driven automation system 145 may access the supplemental content from the database 140 and utilize the supplemental content to perform one or more actions. For example, the content driven automation system 145 may access and communicate supplemental content from the database 140 to other devices, such as, for example, listing or guide information for a broadcast channel, metadata associated with playing video content, information associated with playing video content, and so on. In another example, the content driven automation system 145 may access and control other devices using the supplemental content from the database 140.

Accordingly, using the content identifier, supplemental content from the database 140 may be obtained and used to drive automation during playback of content identified using the digital fingerprinting disclosed above. In one example, the content driven automation system 145 may determine device control information (DCI) using the supplemental content. As used herein, device control information (DCI) refers to instructions, rules, policies, configuration information, or the like that changes the state of a device.

Any of the machines, databases, or devices shown in FIG. 1 may be implemented in a general-purpose computer modified (e.g., configured or programmed) by software to be a special-purpose computer to perform the functions disclosed herein for that machine. For example, a computer system able to implement any one or more of the methodologies disclosed herein is discussed below with respect to, for example, FIG. 17. As used herein, a "database" is a data storage resource and may store data structured as, for example, a text file, a table, a spreadsheet, a relational database, a triple store, and/or any suitable combination thereof. Moreover, any two or more of the machines illustrated in FIG. 1 may be combined into a single machine, and the functions disclosed herein for any single machine may be subdivided among multiple machines.

Furthermore, any of the modules, systems, and/or generators may be located at any of the machines, databases, or devices shown in the FIG. 1. For example, the content identification system 135 may include the fingerprint generator 115, the fingerprint generator 125, frames of video content from the device 110 or the device 120, supplemental database 140, content driven automation system 145, among other configurations. In another example, the device 110 may include content driven automation system 145, among other configurations.

C. Examples of Identifying Content

As disclosed herein, in some examples, the systems and methods disclosed herein utilize fingerprints of content to identify the content. In an example, fingerprints based on color features in a portion of video content are used to identify a candidate set of fingerprints. One or more fingerprints based on other features (e.g., features that may not be color-based) may be used to narrow down the set of potential fingerprints in a reference database. The reference fingerprints may identify the video content and provide metadata and other related information pertinent to, or associated with, the video content.

Figure 2:
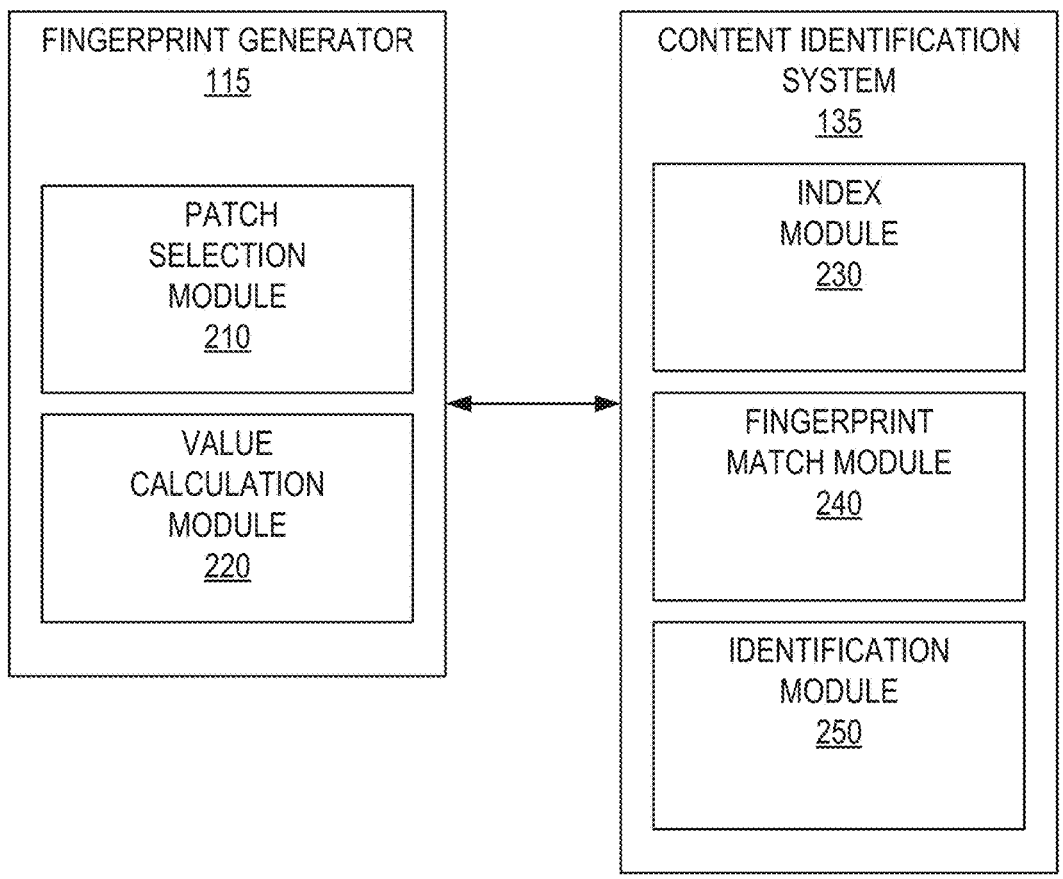
FIG. 2 is a block diagram of an example fingerprint generator and an example content identification system according to the teachings of this disclosure.

FIG. 2 is a block diagram illustrating example components of the fingerprint generator 115 and the content identification system 135, according to the teachings of this disclosure. One or more of the modules disclosed herein may be implemented using hardware (e.g., a processor of a machine) or a combination of hardware and software. Moreover, any two or more of these modules may be combined into a single module, and the functions disclosed herein for a single module may be subdivided among multiple modules.

The fingerprint generator 115 of the device 110 (or, the fingerprint generator 125 of the device 120) may optionally include an example patch selection module 210, an example value calculation module 220, and an example color identification module 225, all configured to communicate with each other (e.g., via a bus, shared memory, or a switch). The content identification system 135 is shown by way of example to also include an example index module 230, an example fingerprint match module 240, and an example identification module 250, all configured to communicate with each other (e.g., via a bus, shared memory, or a switch).

During content playback, the patch selection module 210 may select one or more patches in a frame of video content. The value calculation module 220 may calculate the value of a fingerprint (e.g., using a hash function) from a selected patch. In some examples, a color identification module (not shown) may identify colors in the patch for calculating a further color-based fingerprint.

In some examples, the fingerprint generator 115 is configured and/or programmed to generate a fingerprint of one or more frames of video content captured at the device 110. For example, the fingerprint generator 115 may calculate one or more values of patches, such as average luminance of a patch, optical flow between subsequent frames within a patch, Haar-like features (e.g., edge-based features), regions, portions, and/or other aspects of one or more frames within the video content, and one or more color-based values (e.g., dominant colors or color palettes) within one or more frames of the video content. For example, a patch may be a portion of a frame having various different geometries, a Haar-like feature set, and so on. In some examples, some or all captured patches may each have a different scale and be at a different location within a frame, among other things. Thus, multiple fingerprints may be generated wherein at least two fingerprints are based on different features of a portion of the video content (e.g., one fingerprint may be based on a particular patch and another fingerprint may be based on color features or characteristics).

The fingerprint generator 115 (and/or the fingerprint generator 125) may generate and/or create fingerprints for identifying unknown video content from one or more portions within the content. For example, video content received by the device 110 (and/or the device 120) may be in different formats and sample rates. Accordingly, in some examples, the fingerprint generator 115 may create, for some or all of the frames of the video content, a query fingerprint for each frame that is scale independent and robust to different compression artifacts. In some examples, the fingerprint generator 115 may combine the query fingerprints of each of the frames to generate a query fingerprint of a block of frames (e.g., multiple frames) of the video content.

The patch selection module 210 may be configured and/or programed to select multiple patches of the video content, such as patches associated with a displayed region of a frame or frames within the video content. The value calculation module 220 may be configured and/programmed to calculate a value for each of the selected multiple patches using an integral image technique. The integral image technique may calculate the values using a summed area table or other data structure that generates a sum of values in a rectangular area of a region.

For example, the patch selection module 210 may select patches, such as Haar-like features that are commonly used in object detection, of regions of a frame or frames. The value calculation module 220 may utilize the Haar-like features to generate and/or calculate a same value for objects in a frame, such as objects in a visual image of a frame, regardless of the relative size of the object. For example, the value calculation module 220 may generate values by approximating Gaussian filters and their derivatives using a box filter (e.g., an average of a region of the frame), wherein derivatives of the Gaussian filters are created by finding the differences in the box filters.

D. Content Driven Automation

Figure 3:
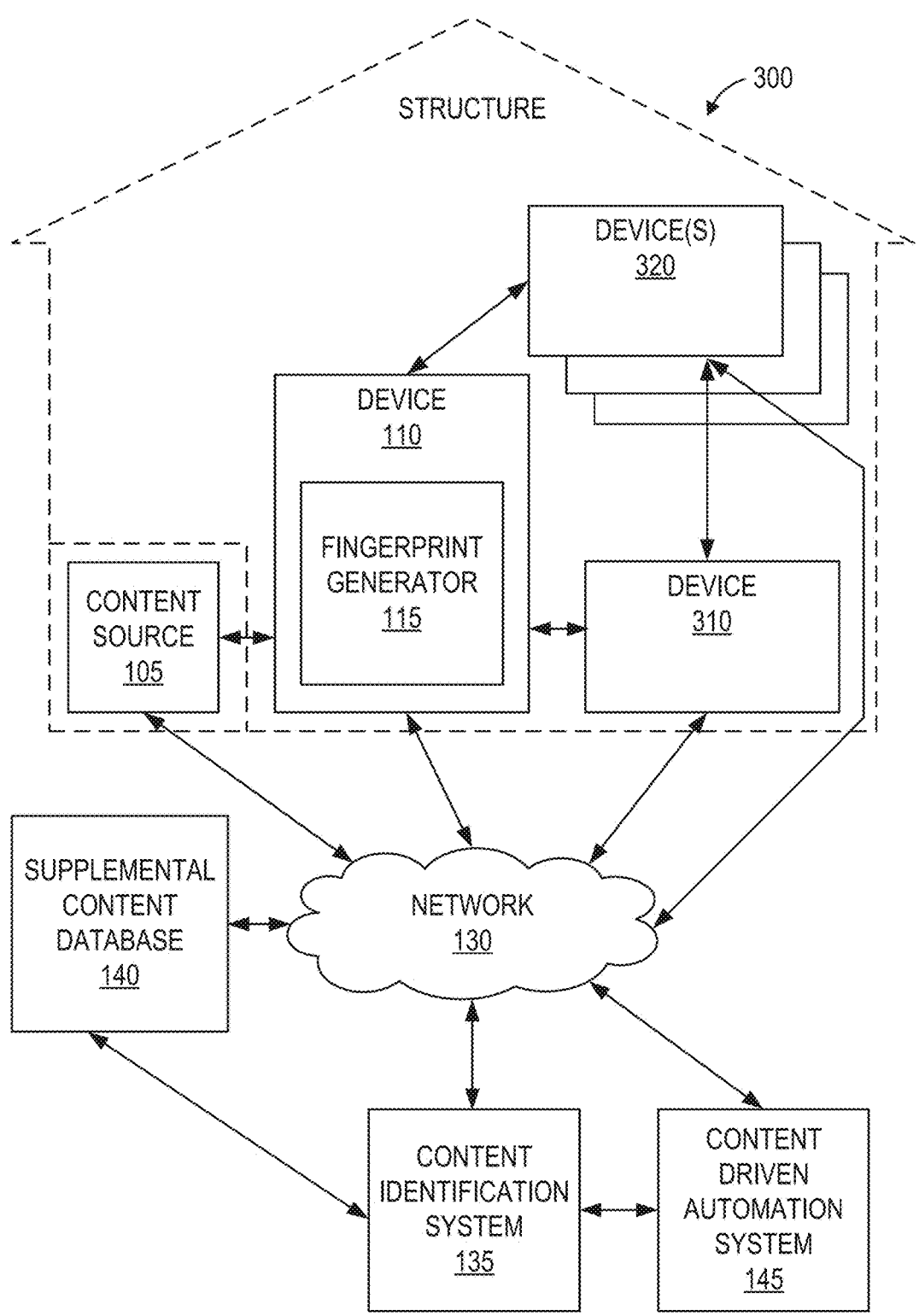
FIG. 3 is a network diagram illustrating an example network environment suitable for providing automation of devices within a structure during playback of content identified using digital fingerprint matching according to the teachings of this disclosure.

FIG. 3 is a network diagram illustrating an example network environment 300 suitable for providing automation of devices within a structure during playback of content identified using digital fingerprint matching, according to the teachings of this disclosure. The network environment 300 can include one or more servers that include hardware and/or software components that perform specific functions. In this example, the network environment 300 includes an example content source 105, an example device 110 having an example fingerprint generator 115, an example network 130, an example content identification system 135, an example supplemental content database 140, and an example content driven automation system 145.

Components of the example network environment 300 of FIG. 3 may be similar to components of the example network environment 100 of FIG. 1, namely, including the device 110 that receives video and other multimedia content from the content source 105, such as a broadcaster, web server, and so on. The device 110 may be found within a structure that includes the device 310 and one or more devices 320.

The device 310 and the device(s) 320 may include, for example, television(s), set-top box(es), laptop(s) and/or other personal computer(s), tablet(s) and/or other mobile device(s), gaming device(s), and/or device(s) capable of changing state using device control information (DCI). Device control information as used herein refers to, for example, any command(s), instruction(s), rule(s), policy (ies), application programming interface(s) (API), etc. that cause a change in state to a device. Device control information may directly or indirectly instruct a device to change state. A change in device state can include, for example, one or more actions, such as, for example, power on, power off, open, close, extend, retract. A change in state may be specified explicitly and/or relatively to another state.

In some examples, the device 310 may include a home automation hub configured to provide control of the one or more devices 320. The device 310 may provide direct wired, network-based, or IR/RF-based control of devices 320. The device 310 may expose one or more application programming interfaces (APIs) that enable other applications to specify the operating state of the device(s) 320. For example, the device 310 may expose a representational state transfer (REST) API to other devices on a local area network. In another example, the device 310 may communicate with a cloud-based service having one or more servers that expose a REST API to one or more clients.

The device(s) 320 may include connected devices and/or smart devices embedded with one or more electronics, software, sensors, actuators, and/or network connectivity that enable the devices to collect and/or exchange data.

Some examples of the device(s) 320 include environmental monitoring device(s) (e.g., thermostats, air and water quality monitors, atmospheric monitors, soil monitors, wildlife movement monitors, or the like), infrastructure monitoring device(s) (e.g., traffic control systems, bridge and railway monitors, power generation and transmission monitors, or the like), manufacturing monitoring device(s) (e.g., equipment and assembly control monitors, process control monitors, or the like), and/or building and home automation device(s) (e.g., mechanical, electrical, and electronic control systems, lighting, fixtures and dressings, or the like).

In some examples, the device 110 communicates with the content identification system 135 over the network 130 to perform digital fingerprint matching. The content identification system 135 may identify content being played back on the device 110 using a digital fingerprint. Upon identifying the content, the content identification system 135 may return a content identifier for supplemental content (e.g., metadata, event-based information, and so on) associated with the content analyzed or identified as being displayed on the device 110.

In examples, the content identifier and/or the supplemental content may be used to drive automation of device(s) 310 and/or 320 during playback of content identified using the digital fingerprinting. For example, using the content identifier and/or the supplemental content, the content driven automation system 145 may generate device control information (DCI) and send the DCI to the devices 310 and/or 320. In some examples, the device 310 receives DCI in response to the content identification system 135 identifying content using digital fingerprinting. The device 310 may perform one or more actions based on the received DCI. The device 310 may change state, and/or the device 310 may change the state of one or more of devices 320.

Any of the machines, databases, or devices shown in FIG. 3 may be implemented in a general-purpose computer modified (e.g., configured or programmed) by software to be a special-purpose computer to perform the functions disclosed herein for that machine. Moreover, any two or more of the machines illustrated in FIG. 3 may be combined into a single machine, and the functions disclosed herein for any single machine may be subdivided among multiple machines.

Furthermore, any of the modules, systems, and/or generators may be located at any of the machines, databases, or devices shown in the FIG. 3. For example, the device 110, the device 310, and/or the device(s) 320 may include the content driven automation system 145, among other configurations.

Figure 4:
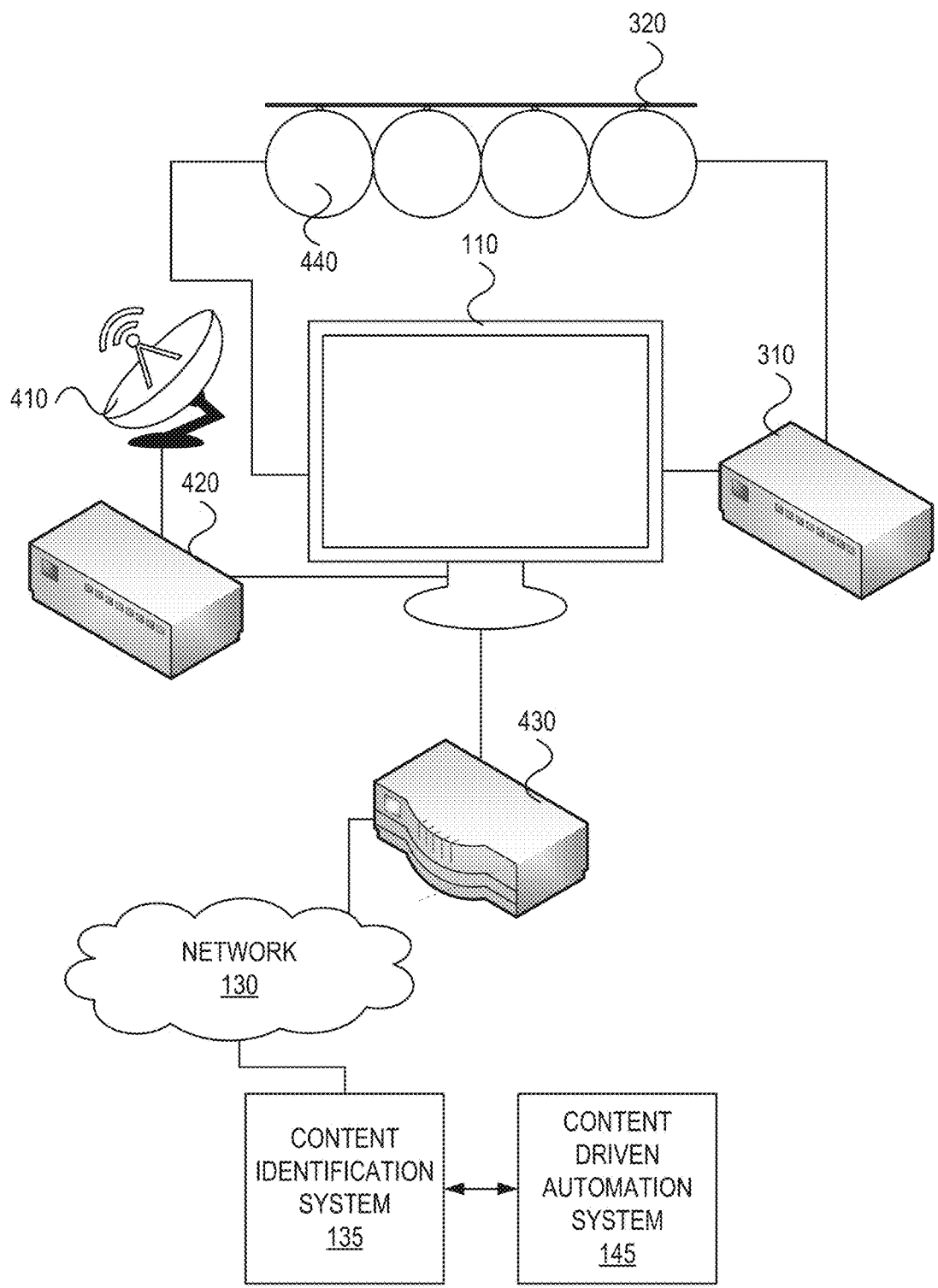
FIG. 4 is a diagram illustrating the example network environment of FIG. 3 suitable for providing automation during playback of content identified using digital fingerprint matching, where one or more devices include home theater elements and lighting.

FIG. 4 is a diagram illustrating the example network environment 300 of FIG. 3 suitable for providing automation during playback of content identified using digital fingerprint matching according to the teachings of this disclosure, where one or more devices include home theater elements and lighting. In this example, the network environment 300 includes a satellite dish 410 configured to receive content, for example, using digital satellite broadcasting. The receiver 420 receives the digital broadcast from dish 410 and drives the device 110 embodied as a high-definition (HD) television.

A manufacturer of the device 110 may include one or more hardware and/or software elements embodied as the fingerprint generator 115. The device 110 may periodically and/or aperiodically, such as, for example, every 15-20 ms, generate a fingerprint of the digital broadcast. The fingerprint can be generated for one frame of the content (e.g., video content). In some examples, the fingerprint is generated for two or more frames of the content. In some examples, the fingerprint is generated for one or more particular or selected frame(s). The device 110 may then send the fingerprint using a router 430 over the network 130 to the content identification system 135.

The content identification system 135 may receive the fingerprint from the device 110. The content identification system 135 may use digital fingerprinting to determine a content identifier associated with the content being played with the device 110. The content identification system 135 may determine a content identifier associated with supplemental content in the database 140.

The content identification system 135 may communicate the content identifier to content driven automation system 145. The content driven automation system 145 may use the content identifier to obtain the supplemental content from the database 140. Using the supplemental content, the content driven automation system 145 may determine one or more actions that change the state of the device 310 and/or the device(s) 320. The content driven automation system 145 may drive changes in state of the device 310 and/or the device(s) 320 according to the content being played back on the device 110.

In some examples, the device 310 may receive device control information (DCI) generated using digital fingerprinting of content being played back on the device 110. The device 310 may receive the DCI over the network 130. The device 310 may perform one or more actions to change the state of the device(s) 320. The device(s) 320 can, for example, include a lighting fixture 440. The lighting fixture 440 can provide automation driven lighting effects, such as, for example, on/off, brightness, color variation, blinking, strobing, and the like. In some examples, the lighting fixture 440 can be configured by the device 310 to reflect a mood color associated with the content being played back on the device 110. In some examples, the lighting fixture 440 can be configured by the device 310 to, for example, turn on/off, blink, strobe, change color, hue, and/or intensity in response to real-time events occurring during playback of the content on the device 110.

In some examples, the device(s) 320 may directly receive device control information (DCI) generated using digital fingerprinting of content being played back on the device 110. The device(s) 320 may receive the DCI over the network 130. The devices 320 may perform one or more actions to change state. The device(s) 320 can, for example, be controlled by the device 110.

Figure 5:
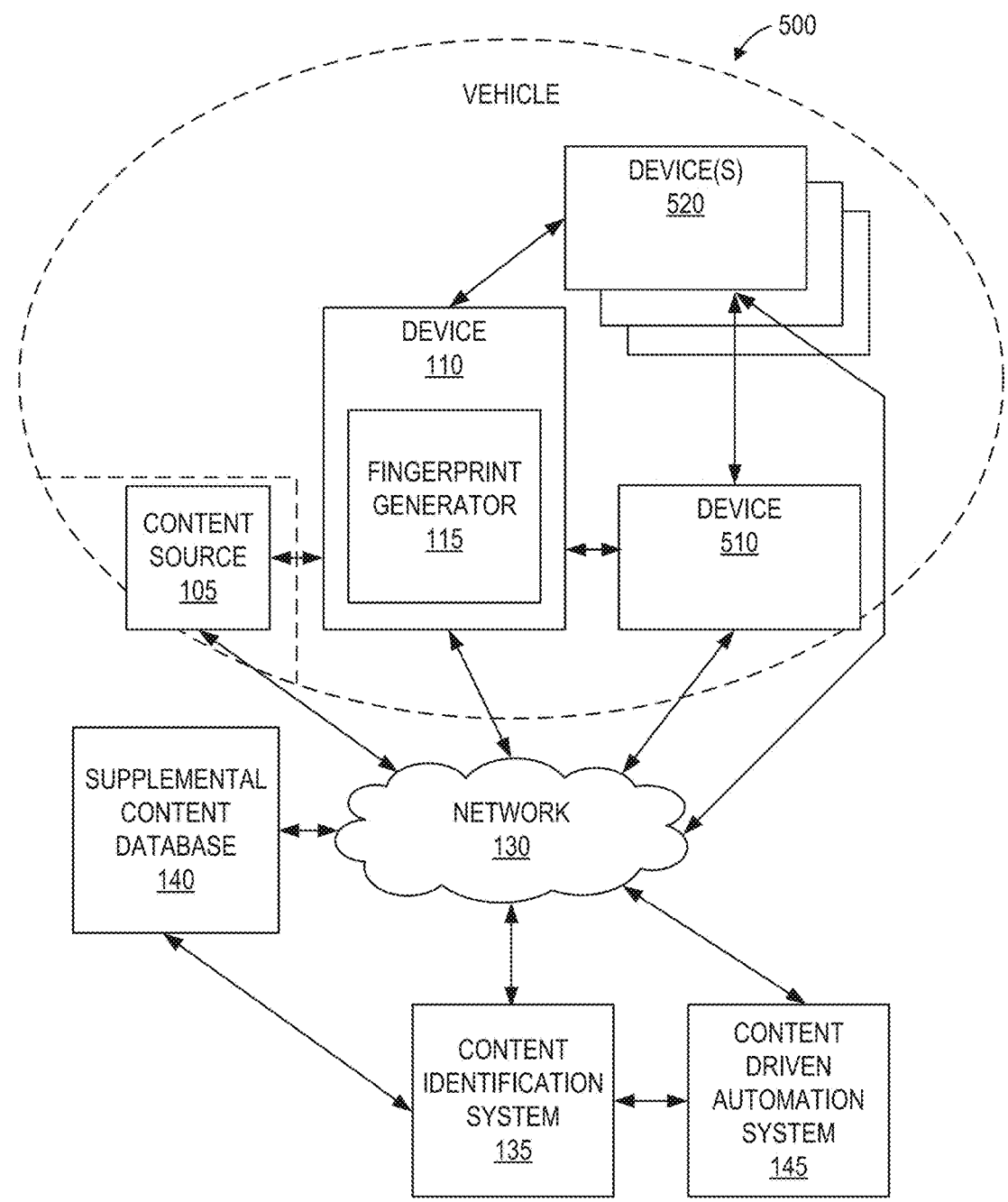
FIG. 5 is a network diagram illustrating an example network environment suitable for providing automation of devices within a vehicle during playback of content identified using digital fingerprint matching according to the teachings of this disclosure.

FIG. 5 is a network diagram illustrating an example network environment 500 suitable for providing automation of devices within a vehicle during playback of content identified using digital fingerprint matching according to the teachings of this disclosure. The network environment 500 can include one or more servers that include hardware and/or software components that perform specific functions. In this example, the network environment 500 includes an example content source 105, an example device 110 having an example fingerprint generator 115, an example network 130, an example content identification system 135, an example supplemental content database 140, and an example content driven automation system 145.

Components of the example network environment 500 of FIG. 5 may be similar to components of the example network environment 100 of FIG. 1, namely, including the device 110 that receives video and other multimedia content from the content source 105, such as a broadcaster, web server, and so on. The device 110 may be found within a vehicle that includes a device 510 and one or more devices 520.

The device 510 and the device(s) 520 may include, for example, television(s), set-top box(es), laptop(s) and/or other personal computer(s), tablet(s) and/or other mobile device(s), gaming device(s), vehicle dashboard instrument(s), console control(s), environmental control(s), and/or device(s) capable of changing state using device control information (DCI). In some examples, the device 310 may be a smart vehicle platform configured to provide control of the one or more device(s) 520. The device 510 may provide direct wired, network-based, or IR/RF-based control of the device(s) 520. The device 510 may expose one or more application programming interface(s) (APIs) that enable other applications to specify the operating state of device(s) 520. For example, the device 510 may expose a representational state transfer (REST) API to other devices on a local area network. In another example, the device 510 may utilize a controller area network (CAN) bus, which is a vehicle bus standard designed to allow microcontrollers and devices to communicate with each other in applications without a host computer. The device(s) 520 may change state in response to a message-based protocol.

The device(s) 520 may include connected devices and smart devices embedded with one or more electronics, software, sensors, actuators, and/or network connectivity that enable the devices to collect and/or exchange data. Some examples of device(s) 520 include environmental monitoring device(s) (e.g., thermostats, air and water quality monitors, atmospheric monitors, soil monitors, wildlife movement monitors, or the like), vehicular monitoring device(s) (e.g., traffic control systems, tire pressure monitors, navigation aids, seat controls, or the like), manufacturing monitoring device(s) (e.g., equipment and assembly control monitors, process control monitors, or the like), and/or building and home automation device(s) (e.g., mechanical, electrical, and electronic control systems, lighting, fixtures and dressings, or the like).

In some examples, the content identification system 135 communicates with the device 110 over the network 130. The content identification system 135 may identify content being played with the device 110 using digital fingerprint matching. Upon identifying the content, the content identification system 135 may return a content identifier for supplemental content (e.g., metadata, event-based information, and so on) associated with the content analyzed or identified as being displayed or played back on the device 110.

In some examples, the content identifier and/or the supplemental content may be used to drive automation of the device(s) 510 and/or 520 during playback of content identified using the digital fingerprinting. For example, using the content identifier and/or the supplemental content, the content driven automation system 145 may generate device control information (DCI) and send the DCI to one or more devices 510, 520. In some examples, the device 510 receives DCI in response to the content identification system 135 identifying content using digital fingerprinting. The device 510 may then perform one or more actions based on the received DCI. The device 510 may change state or the device 510 may change the state of one or more of the device(s) 520.

Any of the machines, databases, or devices shown in FIG. 5 may be implemented in a general-purpose computer modified (e.g., configured or programmed) by software to be a special-purpose computer to perform the functions disclosed herein for that machine. Moreover, any two or more of the machines illustrated in FIG. 5 may be combined into a single machine, and the functions disclosed herein for any single machine may be subdivided among multiple machines.

Furthermore, any of the modules, systems, and/or generators may be located at any of the machines, databases, or devices shown in the FIG. 5. For example, the device 110, the device 510, and/or the device(s) 520 may include content driven automation system 145, among other configurations.

Figure 6:
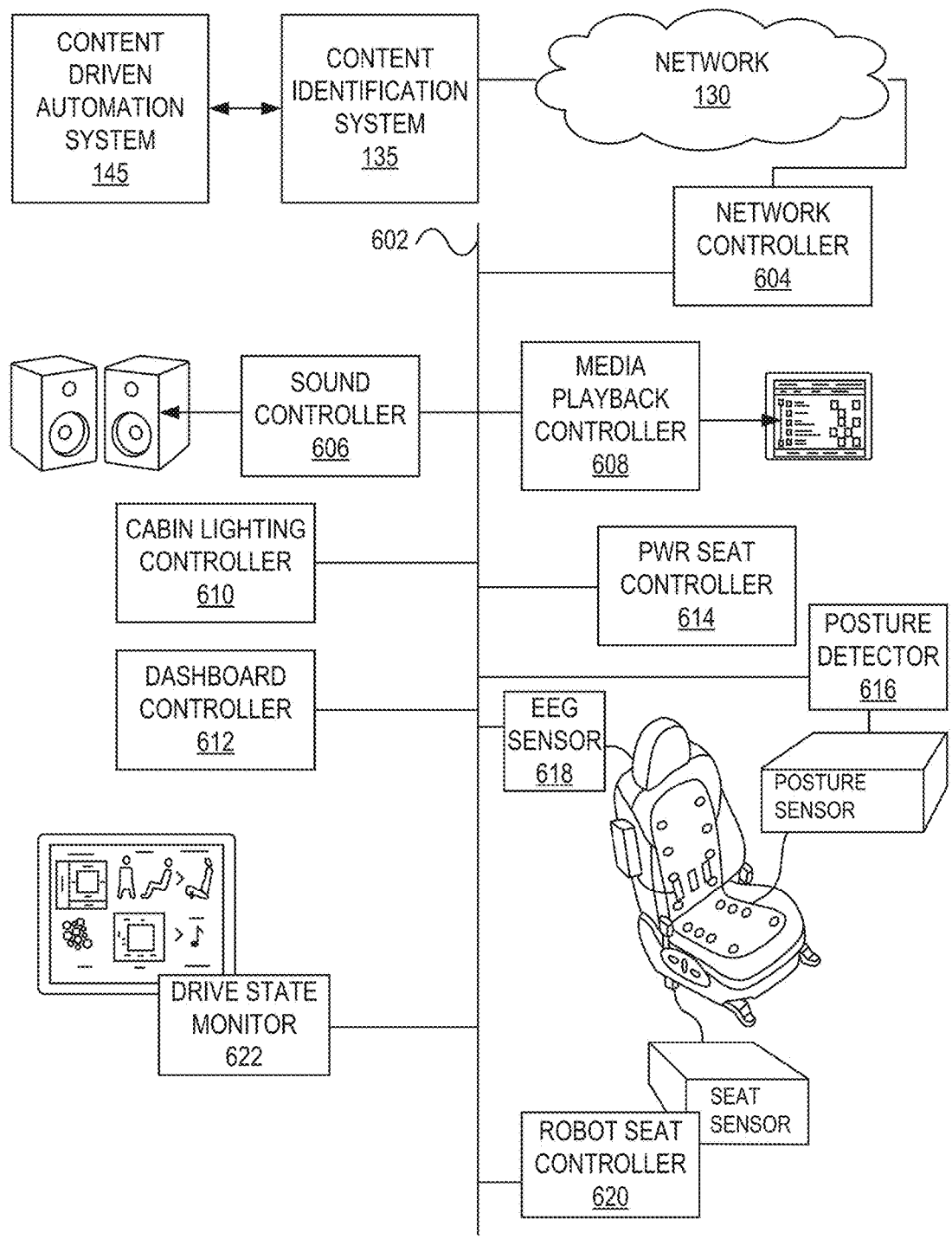
FIG. 6 is a diagram illustrating the example network environment of FIG. 5 suitable for providing automation during playback of content identified using digital fingerprint matching, where one or more devices include vehicle elements and cabin controls.

FIG. 6 is a diagram illustrating the example network environment 500 of FIG. 5 suitable for providing automation during playback of content identified using digital fingerprint matching according to the teachings of this disclosure, where one or more devices include vehicle elements and cabin controls. In this example, the network environment 500 also includes an example controller area network (CAN) bus 602 configured to provide information exchange between components attached to the bus, an example network controller 604 configured to communication with the example network 130, an example sound controller 606 which can provide sound to one or more speakers, an example media playback controller 608 configured to provide media selection and playback, an example cabin lighting controller 610 configured to control lighting in and around the vehicle cabin, an example dashboard controller 612 configured to control presentation of information on a dashboard or heads up display, an example power seat controller 614 configured to control manipulation of one or portions of at least a driver's seat, an example posture detector 616 configured to interface with a posture sensor to determine the posture of the occupant of a seat, an example EEG sensor 618 configured to provide biostats for the occupant of a seat, an example robot seat controller 620 configured to control advances aspects of at least the driver's seat, and an example drive state monitor 622 configured to monitor various aspects of the vehicle, such as the state and operating condition of various components of the vehicle.

The device 110 may be embodied as the media playback controller 608 and include one or more hardware and/or software elements embodied as the fingerprint generator 115. The device 110 may periodically and/or aperiodically, such as, for example, every 15-20 ms, generate a fingerprint of content being played back, such as content sources from radio, TV, DVDs, BDs, etc. The device 110 may send the fingerprint using network controller 604 over the network 130 to the content identification system 135.

The content identification system 135 may receive the fingerprint from the device 110. The content identification system 135 may use digital fingerprinting to determine a content identifier associated with the content being played with the device 110. The content identification system 135 may communicate the content identifier to the content driven automation system 145. The content driven automation system 145 may use the content identifier to obtain supplemental content. The content driven automation system 145 may determine one or more actions to change the state of one or more devices connected to the CAN bus 602. The content driven automation system 145 may drive changes in state of the devices according to the content being played back on the device 110.

In some examples, the media playback controller 608 may receive device control information (DCI) generated using digital fingerprinting of content being played back. The media playback controller 608 may receive the DCI over network 130. The media playback controller 608 may perform one or more actions to change the state of one or more device connected to the CAN bus 602. The media playback controller 608 can, for example, change the state of cabin lighting controller 610 to drive one or more lighting effects, such as, for example, on/off, brightness, color variation, blinking, strobing, and the like. In some examples, the media playback controller 608 can change the state of the dashboard controller 612 to provide real-time information to a driver in response to the content being played back.

In some examples, any of the devices connected to the CAN bus 602 may directly receive device control information (DCI) generated using digital fingerprinting of content being played back. The devices may receive the DCI through the network controller 604 over the network 130.

Figure 7:
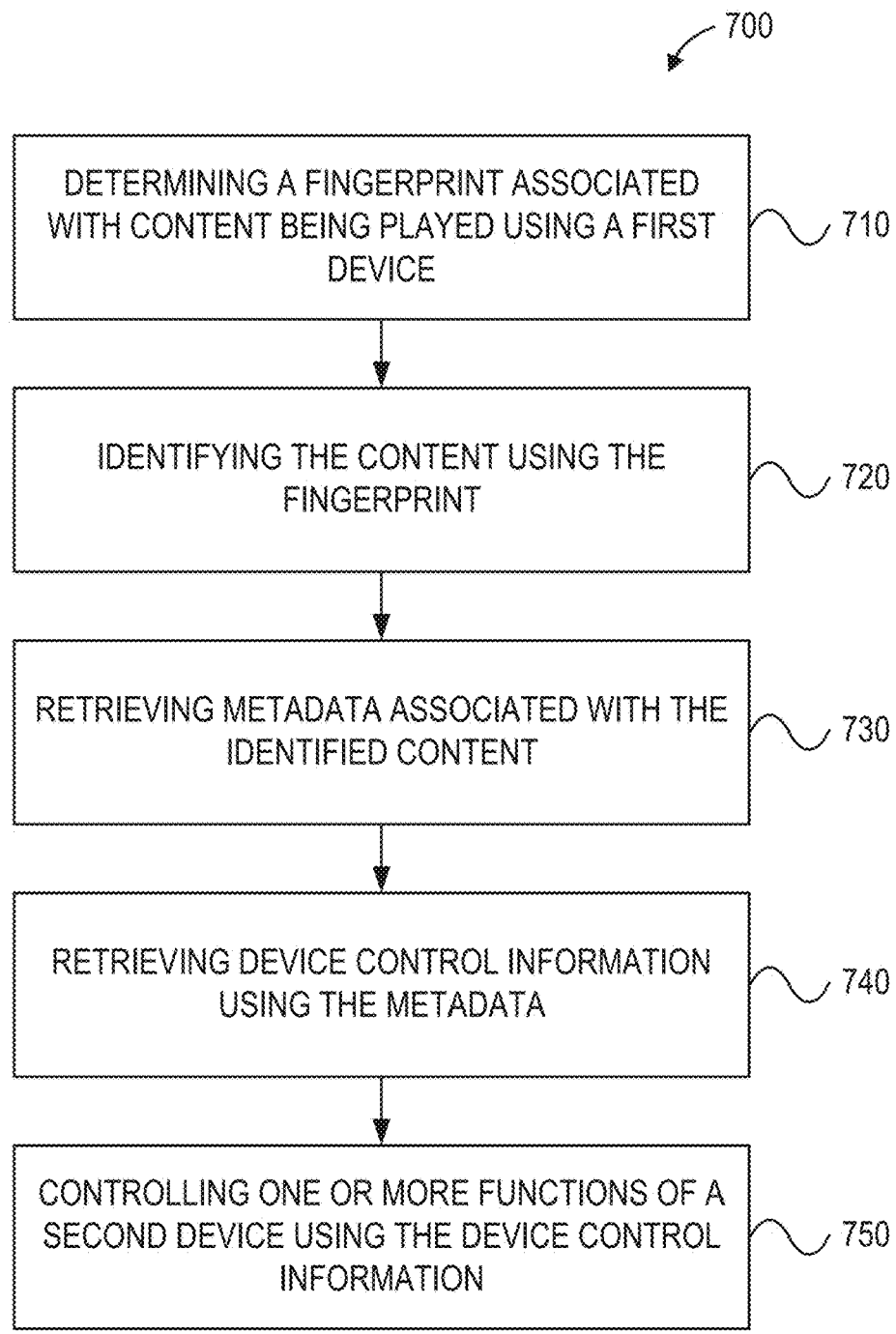
FIG. 7 is a flowchart representative of example machine readable instructions that may be executed to control one or more devices during playback of content identified using digital fingerprint matching according to the teachings of this disclosure.

FIG. 7 is a flowchart representative of example machine readable instructions 700 that may be executed to control one or more devices during playback of content identified using digital fingerprint matching according to the teachings of this disclosure. The example instructions 700 may optionally be performed by components of the example network environment 100 of FIG. 1 and, accordingly, are disclosed herein merely by way of example with reference thereto. It will be appreciated that the example instructions 700 may be executed by any suitable hardware.

In operation 710, a fingerprint associated with content being played using a first device (e.g., the device 110) is determined. The device 110 may determine the fingerprint using a variety of digital fingerprinting generation techniques. In one example, the content identification system 135 may determine the fingerprint from information sent from the device 110. The content identification system 135 may receive the fingerprint as generated from the first device. The fingerprint can include a sampled representation of the content, a digital watermark, or the like.

In operation 720, the content is identified using the fingerprint. In one example, the content identification system 135 may utilize a variety of digital fingerprinting matching techniques to identify the content. One example of the content identification system 135 and digital fingerprinting matching techniques are provided by Gracenote of Emeryville, Calif.

In operation 730, metadata associated with the identified content is retrieved. The metadata can be retrieved using a content identifier determined by the content identification system 135. The content identification system 135 may communicate the content identifier to the content driven automation system 145 for retrieval of supplemental content (i.e., all or part the metadata) from the database 140.

The retrieved metadata can include first metadata and second metadata. The first metadata refers to information directly associated with the identified content. This includes, for example, the title or name of the content, the publisher, the type, the format, etc., as well as optionally a representation of the content itself. The second metadata refers to information derived from the content or the first metadata. The second metadata can include, for example, information that expands the first metadata. Some examples of the second metadata can include mood information, reviews, curated descriptions and summaries, subtitles, closed captioning, supplemental language feeds, simulcast real-time data streams, and the like. One example of the second metadata can include music and video metadata provided by Gracenote of Emeryville, Calif.

In operation 740, device control information (DCI) is retrieved using the metadata associated with the identified content. The content driven automation system 145 may retrieve the DCI from a locally generate source or from an external source. For example, the content driven automation system 145 may interact with one or more local or remote sources to retrieve DCI using music and video metadata associated with the identified content.

In operation 750, one or more functions of a second device (e.g., the device 310 and/or the device(s) 320 of FIG. 3) are controlled using the DCI. The content driven automation system 145 may control the second device by sending the DCI directly to the second device, by sending the DCI to the first device, or by sending the DCI to an intermediary device, such as a home automation hub or cloud-based service that controls the second device.

Figure 8:
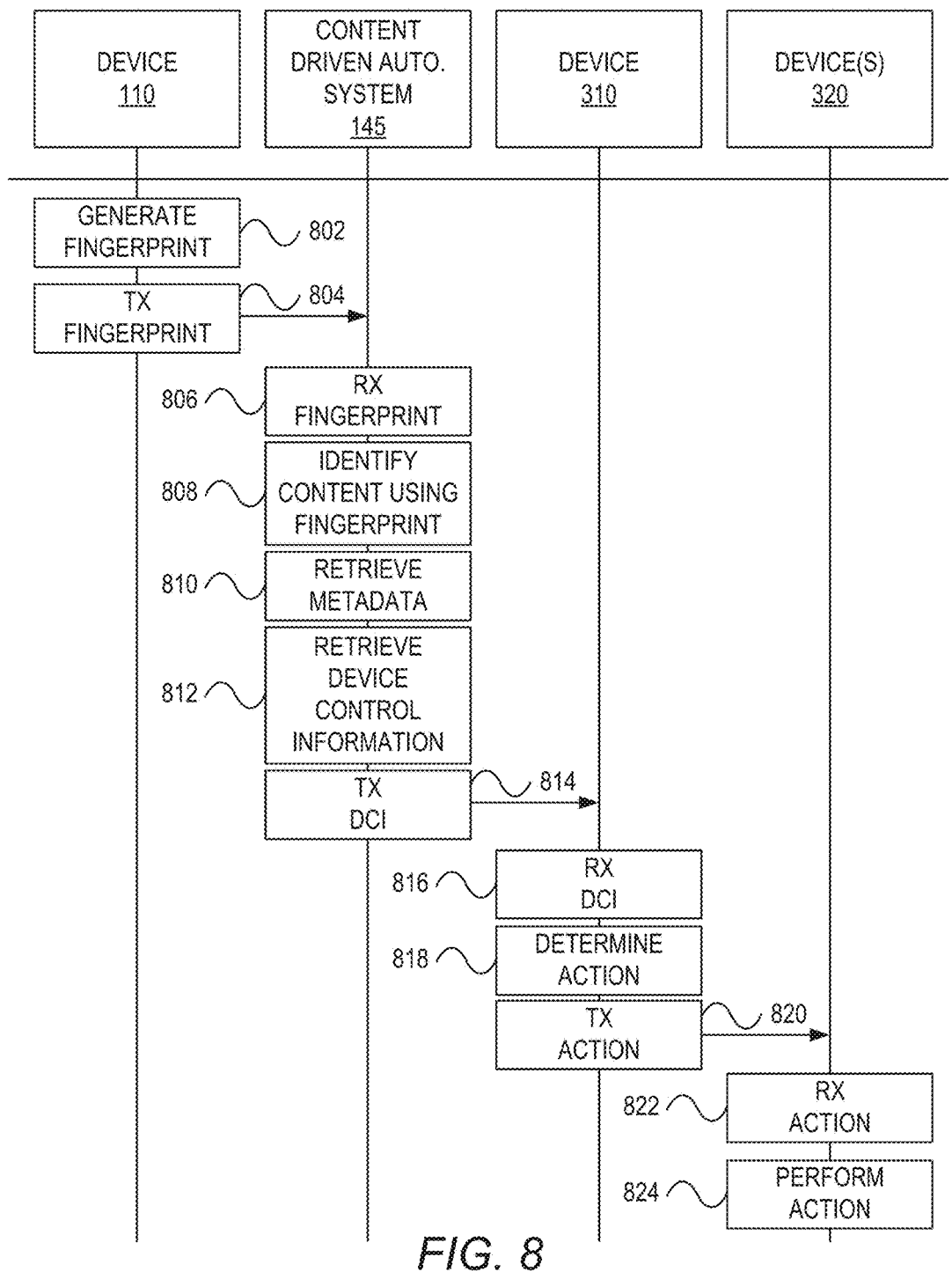
FIG. 8 is a sequence chart representative of example machine readable instructions that may be executed to implement automation during playback of content identified using digital fingerprint matching according to the teachings of this disclosure, where an intermediary device is used to control other devices.

FIG. 8 is a sequence chart representative of example machine readable instructions that may be executed to implement automation during playback of content identified using digital fingerprint matching according to teachings of this disclosure, where an intermediary device is used to control other devices. In this example, the content driven automation system 145 of FIGS. 1 and/or 3 includes functions of or interacts with functions of the content identification system 135 of FIGS. 1 and/or 3.

In operation 802, the device 110 generates a fingerprint of content being played back using the device 110. The device 110 may generate the fingerprint using one or more aspects, characteristics, elements, representations, or combinations thereof associated with the content. The device 110 may generate the fingerprint in response to one or more watermarks associated with the content. The device 110 may generate the fingerprint based on all or a portion of the content.

In operation 804, the device 110 transmits or otherwise communicates the fingerprint to the content driven automation system 145. The device 110 may directly or indirectly send the fingerprint to the content identification system 135 in communication with the content driven automation system 145. The device 110 may periodically and/or aperiodically send one or more fingerprints using, for example, a random schedule and/or a predetermined schedule and/or in response to various triggers, or the like. The device 110 may optionally transmit a fingerprint identifier for the fingerprint already present at the content identification the device 110. The device 110 may send to the content identification system 135 other information, such as, for example, information associated with the content, information associate with a user context, information associated with the device 310, the device(s) 320, or the like.

In operation 806, the content driven automation system 145 receives the fingerprint. The content driven automation system 145 may receive the fingerprint directly or indirectly from the device 110, such as through, for example, communication with the content identification system 135. The content driven automation system 145 may receive additional information from the device 110.

In operation 808, the content identification system 135 in communication with the content driven automation system 145 identifies the content being played back using the device 110 using the received fingerprint. The content identification system 135 may identify the content as content having the same or substantially the same fingerprint. The content identification system 135 may match the fingerprint to one or more fingerprints representing all or a portion of the content. The content identification system 135 may identify the content using, for example, a locally maintained database of digital fingerprints. The content identification system 135 may further identify the content using, for example, one or more third-party services, cloud-based services, or the like.

In operation 810, the content driven automation system 145 retrieves metadata associated with the identified content. The metadata can include, for example, information describing content, information describing technical aspects of the content, information describing ownership of the content, information describing digital rights associated with the content, various tags embedded in or otherwise associated with the content, information describing additional language streams, information describing supplemental or simulcast data streams, or the like. The metadata can further include, for example, information about a user of the device 110, information about the device 110, and/or information about other devices associated with the device 110.

In some examples, the retrieved metadata can include first metadata and second metadata. The content driven automation system 145 may retrieve the first metadata from a locally maintained database, such as, for example, a music and/or video catalog, and/or optionally from an online service. The content driven automation system 145 may retrieve the second metadata in a manner similar to retrieval of the first metadata. The first metadata may be representative of information derived from the content, such as, for example, tags and/or other descriptive information. The second metadata may be representative of metadata for the first metadata, additional or curated information about the identified content, or the like.

In operation 812, the content driven automation system 145 retrieves device control information (DCI) using the metadata. In some examples, the content identification system 135 generates the DCI using the metadata. The content driven automation system 145 may utilize the identified content, the retrieved metadata, and/or combinations thereof, to determine one or more actions that change the state of one or more devices. In some examples, the content driven automation system 145 may implement one or more processors, engines, rule modules, and/or policy engines to evaluate mappings or relationships between characteristics of the identified content and changes in state of the one or more devices. The characteristics of the identified content can be extracted from, determined from, and/or otherwise inferred from the metadata associated with the content. In some examples, the content driven automation system 145 may implement one or more processors, engines, rule modules, and/or policy engines to evaluate mappings or relationships between events and changes in state of the one or more devices. The events associated with the identified content can be extracted from, determined from, and/or otherwise inferred from the metadata associated with the content.

The content driven automation system 145 may generate the DCI using the instruction sets, command language references, API plugins, and other compatible means for initiating or invoking the changes in state of the one or more devices. The DCI may include, for example, instructions, commands, calls, data structures directly usable by the one or more devices, usable by an intermediary device that controls the one or more devices, and/or usable by one or more cloud-based services in communication with the one or more devices.

In operation 814, the content driven automation system 145 transmits or otherwise communicates the DCI to the device 310. The content driven automation system 145 may directly or indirectly send the DCI to the device 310. In some examples, the content driven automation system 145 sends the DCI to an intermediary device or a cloud-based service in communication with the device 310. The content identification system 135 may periodically send the DCI in response to receiving the fingerprint, using, for example a random schedule and/or a predetermined schedule and/or in response to various triggers, or the like. The content identification system 135 may send to the device 310 other information, such as, for example, information associated with the content, information associate with a user context, information associated with devices 310 and/or 320, or the like.

In some examples, the content driven automation system 145 communicates the DCI using one or more messages to the device 310. The one or more messages may include one or more calls to an API associated with the device 310 or a cloud-based service in communication with the device 310.

In operation 816, the device 310 receives the DCI. The device 310 may receive the DCI directly or indirectly from the content driven automation system 145. The device 310 may receive additional information from the content identification system 135.

In operation 818, the device 310 determines one or more actions using the DCI. The device 310 may be directly instructed or controlled using the DCI. In some examples, the device 310 may parse and interpret the DCI to determine the action(s). The device 310 may include one or more security or firewall module that identify whether the sender of the DCI is permitted, whether the action(s) are permitted, or the like.

In some examples, the device 310 acts as an automation hub or controller of additional devices. In operation 820, the device 310 transmits or otherwise communicates the action to the device(s) 320. In some examples, the device 310 may merely route the DCI to the device(s) 320. In some examples, the device 310 may communicate the action(s) by sending one or more messages to the device(s) 320. The messages may include, for example, calls to one or more APIs exposed by the device 310, calls to one or more ports associated with the device 310, or the like.

In operation 822, the device(s) 320 receives the action(s). The device(s) 320 may receive the action(s) directly or indirectly from the device 310. The device(s) 320 may receive additional information from the device 310. In operation 824, the device(s) 320 perform the action(s) to change state. The action(s) may include, for example, powering on/off, adjusting volume, changing channels, and/or changing color, hue, and/or intensity, or the like.

Although some operations are show as a transmission of data, the operations can be invoked in a request response scenario, a push scenario, a pull scenario, or the like.

Figure 9:
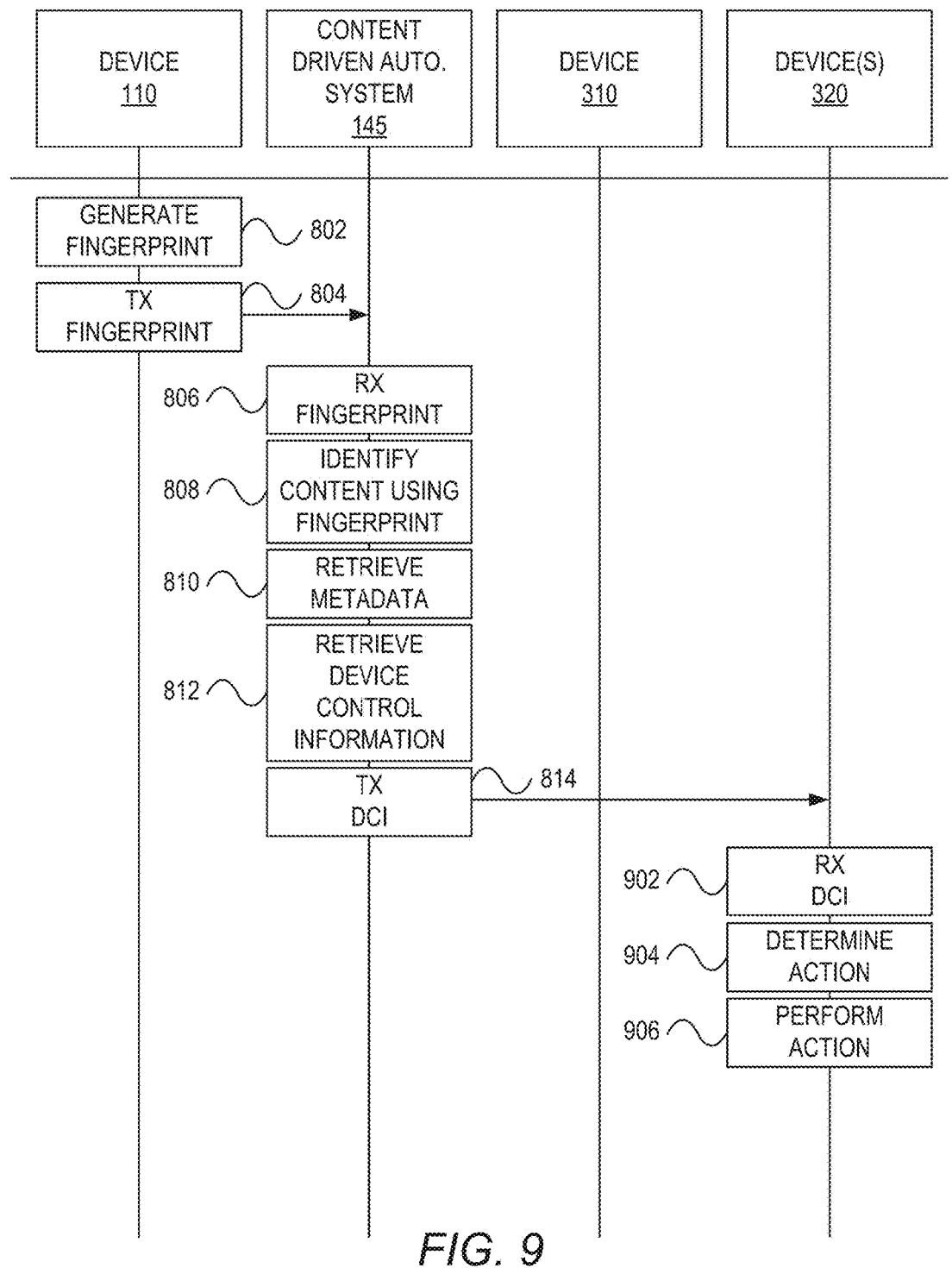
FIG. 9 is a sequence chart representative of example machine readable instructions that may be executed to implement automation during playback of content identified using digital fingerprint matching according to the teachings of this disclosure, where a content identification system directly controls one or more devices.

FIG. 9 is a sequence chart representative of example machine readable instructions that may be executed to implement automation during playback of content identified using digital fingerprint matching according to the teachings of this disclosure, where the content identification system 135 directly controls one or more devices. In this example, operations 802-812 are performed substantially as disclosed with respect to FIG. 8.

In operation 814, the content driven automation system 145 communicates the DCI using one or more messages directly to the device(s) 320. The one or more messages may include one or more calls to an API associated with the device(s) 320 or a cloud-based service in communication with the device(s) 320.

In operation 902, the device(s) 320 receive the DCI from the content driven automation system 145. The device(s) 320 may receive additional information from the content identification system 135.

In operation 904, the device(s) 320 determine one or more actions using the DCI. The device(s) 320 may be directly instructed or controlled using the DCI. In some examples, the device(s) 320 parse and interpret the DCI to determine the action(s). The device(s) 320 may include one or more security or firewall module(s) that identify whether the sender of the DCI is permitted, whether the action(s) are permitted, or the like.

In operation 906, the device(s) 320 perform the action(s) to change state. The action(s) may include, for example, powering on/off, adjusting volume, changing channels, and/or changing color, hue, and/or intensity, or the like.

Although some operations are show as a transmission of data, the operations can be invoked in a request response scenario, a push scenario, a pull scenario, or the like.

Figure 10:
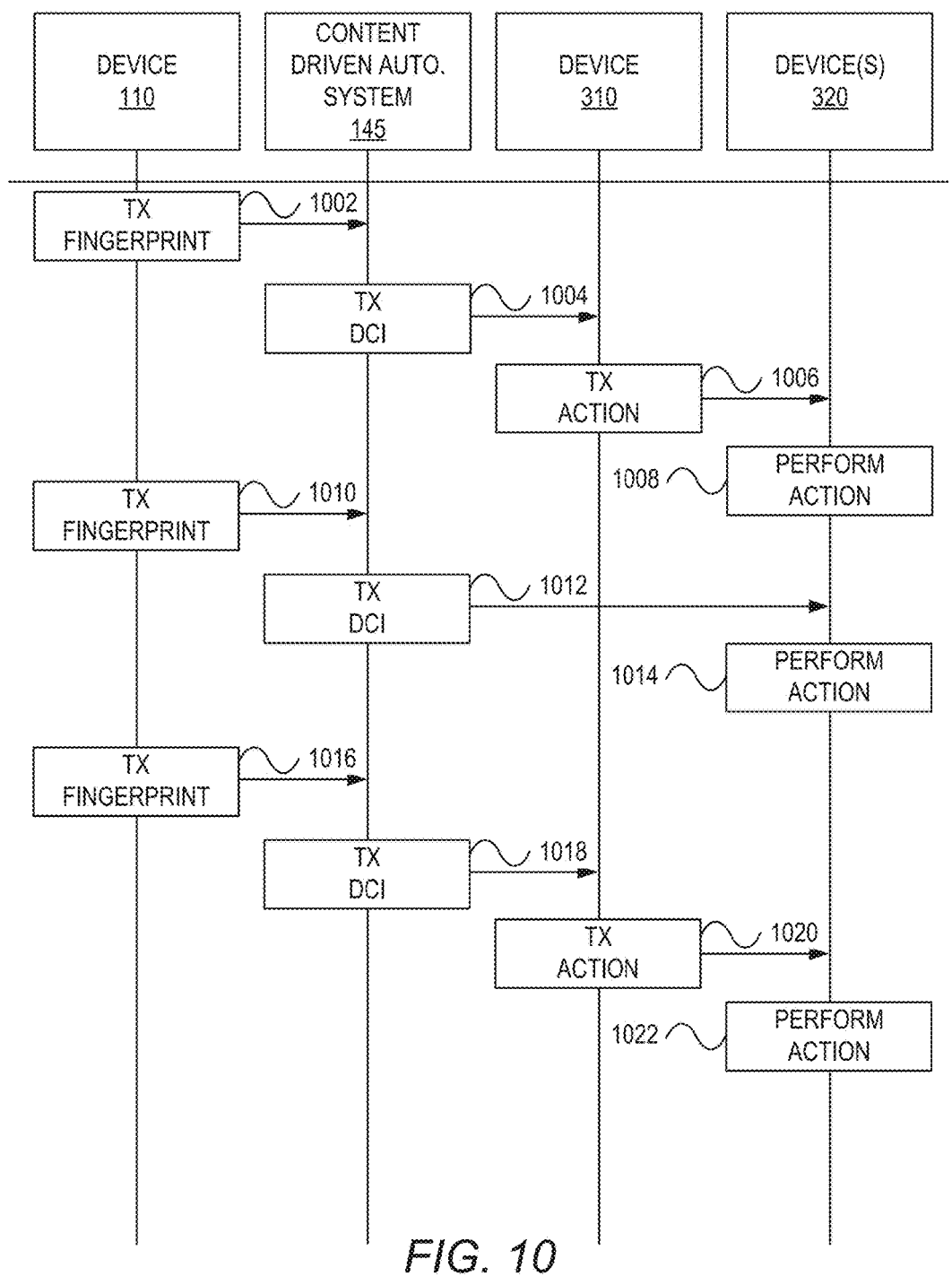
FIG. 10 is a sequence chart representative of example machine readable instructions that may be executed to implement continuous real-time automation during playback of content identified using digital fingerprint matching according to the teachings of this disclosure.

FIG. 10 is a sequence chart representative of example machine readable instructions that may be executed to implement continuous real-time automation during playback of content identified using digital fingerprint matching, according to teachings of this disclosure. In operation 1002, the device 110 generates and transmits a fingerprint of the content to the content identification system 135. In operation 1004, the content driven automation system 145 (e.g., via the content identification system 135) receives the fingerprint, identifies the content, collects any applicable metadata, determines device control information (DCI), and transmits the DCI to the device 310. In operation 1006, the device 110 receives the DCI and transmits an action to the device(s) 320. In operation 1008, the device(s) 320 receive the action and perform the action.

In operation 1010, the device 110 generates and transmits a fingerprint of the content to the content driven automation system 145. In operation 1012, the content driven automation system 145 receives the fingerprint, identifies the content, collects any applicable metadata, determines device control information (DCI), and transmits the DCI directly to the device(s) 320. In operation 1014, the device(s) 320 receive the DCI and perform the action.

In operation 1016, the device 110 further generates and transmits a fingerprint of the content to the content driven automation system 145. In operation 1018, the content driven automation system 145 receives the fingerprint, identifies the content, collects any applicable metadata, determines device control information (DCI), and transmits the DCI to the device 310. In operation 1020, the device 110 receives the DCI and transmits an action to the device(s) 320. In operation 1022, the device(s) 320 receive the action and perform the action.

Accordingly, the operations disclosed above may be periodically and/or aperiodically repeated to ensure that the current state of device(s) 310 and/or 320 or any change in state is relevant to the content being played back using the device 110.

E. Automation Driven Using Content Characteristics

Figure 11:
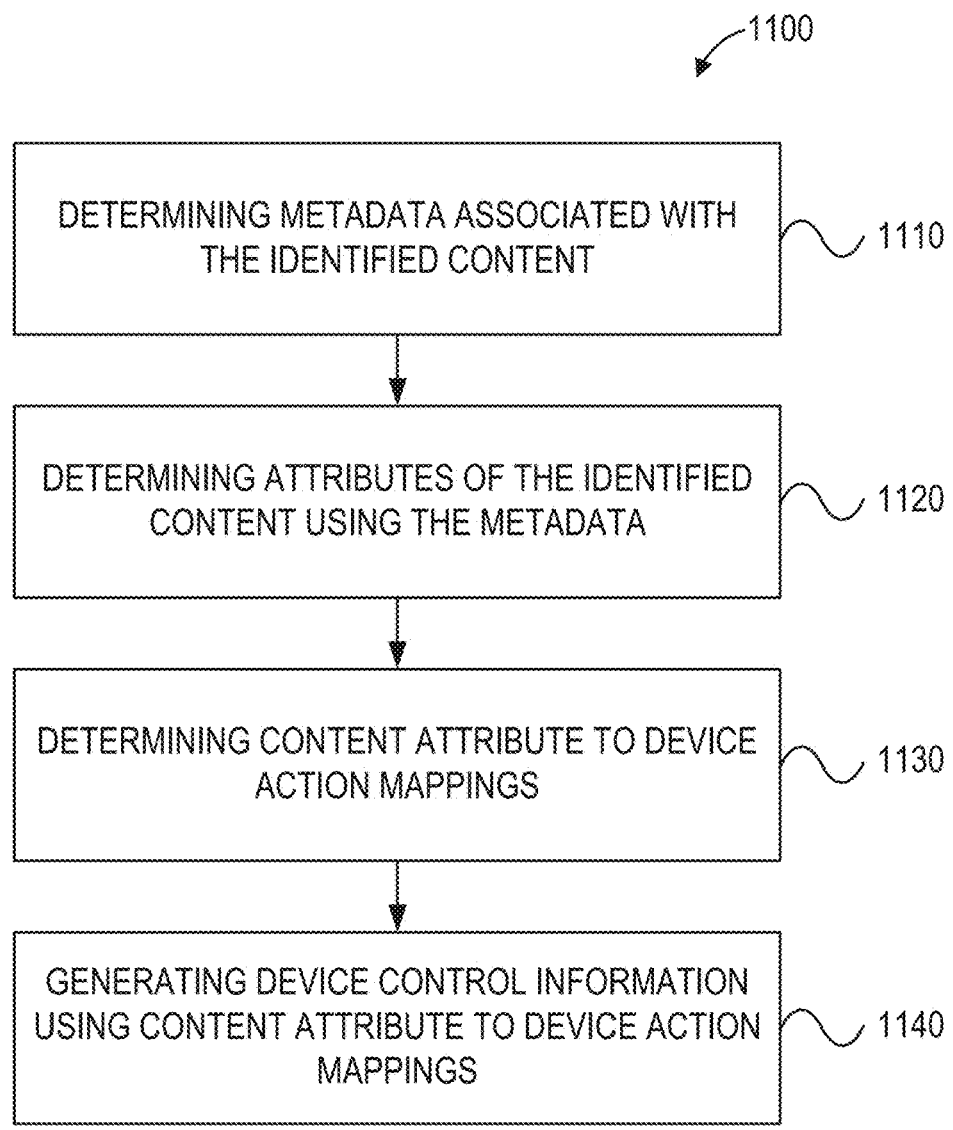
FIG. 11 is a flowchart representative of example machine readable instructions that may be executed to generate device control information using content attributes for controlling one or more devices during playback of content identified using digital fingerprint matching according to the teachings of this disclosure.

FIG. 11 is a flowchart representative of example machine readable instructions 1100 that may be executed to generate device control information using content attributes for controlling one or more devices during playback of content identified using digital fingerprint matching, according to the teachings of this disclosure. The instructions 1100 may optionally be performed by components of the network environment 300 and, accordingly, are disclosed herein merely by way of example with reference thereto. It will be appreciated that the instructions 1100 may be executed by any suitable hardware.

In operation 1110, the content driven automation system 145 determines metadata associated with the identified content. The metadata may include, for example, information embedded within the content, content tags, content description information, or the like. The metadata may also include curated information about the content obtained from, for example, proprietary sources, social networks, news feeds, etc.

In operation 1120, the content driven automation system 145 determines one or more attributes of the identified content using the first metadata. Some examples of attributes of the identified content can include, for example, title, author, album, album artist, grouping, composer, year, track number, comments, genre, description, show, episode identification, copyright, rating, language, encoder, size, height, width, format, type, container, video data rate, audio data rate, sample rate, sample size, or the like.

In operation 1130, the content driven automation system 145 determines a content attribute to device action mapping. In some examples, one or more relationships can be created between content attributes and devices actions. For example, actions to change state of a device to different color hues can be mapped to different titles, albums, artists, genres, shows, episodes, or the like. In another example, actions to change state of a device to turn on/off, blink, strobe, pulse, etc., can be mapped to one or more content attributes.

In operation 1140, the content driven automation system 145 generates device control information (DCI) using the content attribute to device action mappings. In some examples, the content driven automation system 145 determines a set of mapping rules based on the content attributes. The content driven automation system 145 may evaluate the determined set of rules to identify one or more devices actions. The mapping rules may specify one or more actions that can be used to generate the DCI.

Figure 12A:
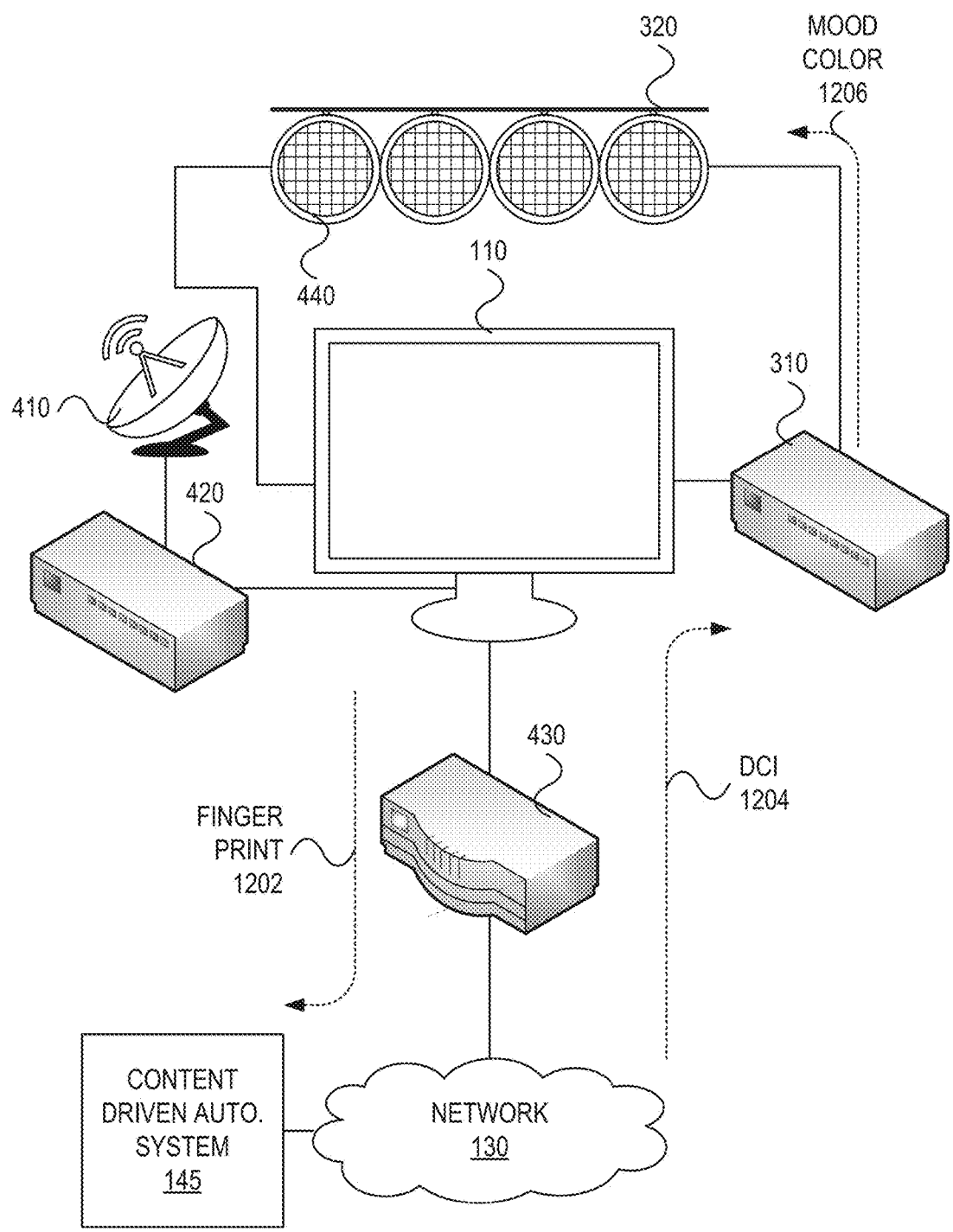
FIG. 12A is a diagram illustrating the example network environment of FIG. 4 suitable for providing lighting automation based on a mood attribute during playback of content identified using digital fingerprint matching according to the teachings of this disclosure.

FIG. 12A is a diagram illustrating the network environment 300 of FIGS. 3 and/or 4 suitable for providing lighting automation based on a mood attribute during playback of content identified using digital fingerprint matching, according to the teachings of this disclosure. In this example, the device 110 may periodically and/or aperiodically, such as, for example, every 15-20 ms, generate a fingerprint 1202 of the digital broadcast. The device 110 may send the fingerprint 1202 using the router 430 over the network 130 to the content identification system 135.

The content identification system 135 may receive the fingerprint 1202 from the device 110. The content identification system 135 may use digital fingerprinting to identify the content being played with the device 110. The content driven automation system 145 can utilize the content identifier to determine supplemental content and one or more actions to change the state of the device(s) 320. The content driven automation system 145 may generate device control information (DCI) and send the DCI to the device 310. In some examples, the device 310 may receive the DCI over network 130. The device 310 may perform one or more actions to change the state of the device(s) 320. The device(s) 320 can, for example, include the lighting fixture 440. The lighting fixture 440 can provide mood based lighting effects while content is being played using the device 110. In some examples, the device 310 utilizes the DCI to have the lighting fixture 440 reflect a mood color 1206 associated with the content being played back on the device 110.

In some examples, the content driven automation system 145 may generate device control information (DCI) and send the DCI to the device 110 for controlling the device 310 and/or the device(s) 320. In some examples, the device 110 may receive the DCI over network 130. The device 110 may perform one or more actions to change the state of the device 310 and/or the device(s) 320.

Figure 12B:
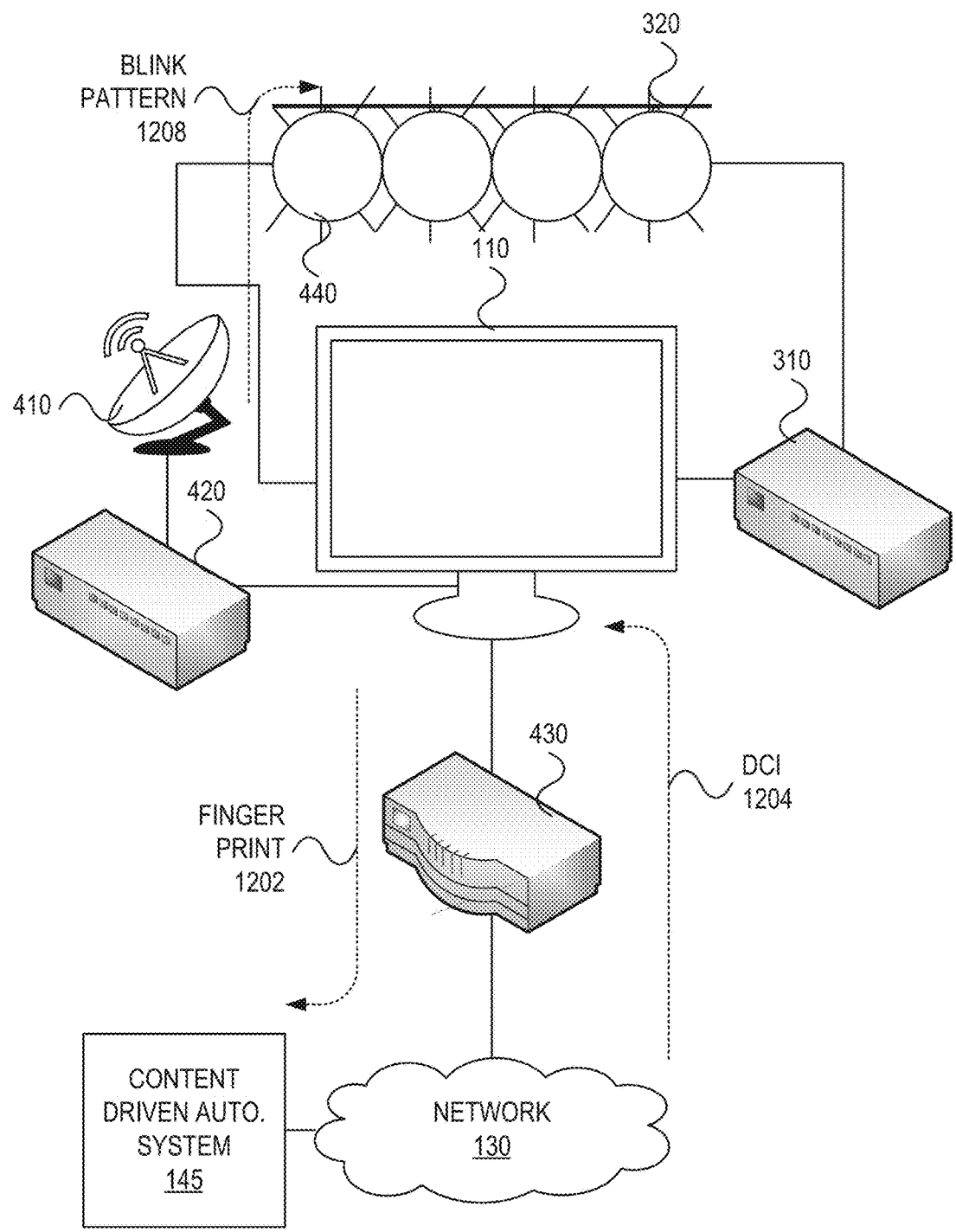
FIG. 12B is a diagram illustrating the example network environment of FIG. 4 suitable for providing lighting automation based on a program guide information during playback of content identified using digital fingerprint matching according to the teachings of this disclosure.

FIG. 12B is a diagram illustrating the network environment 300 of FIGS. 3 and/or 4 suitable for providing lighting automation based on a program guide information during playback of content identified using digital fingerprint matching, according to teachings of this disclosure. In some examples, the device 110 may periodically and/or aperiodically, such as, for example, every 15-20 ms, generate a fingerprint 1202 of the digital broadcast. The device 110 may send the fingerprint 1202 using the router 430 over the network 130 to the content identification system 135.

The content identification system 135 may receive the fingerprint 1202 from the device 110. The content identification system 135 may use digital fingerprinting to identify the content being played with the device 110. The content driven automation system 145 may receive a content identifier and determine supplemental content indicative of one or more actions to change the state of the device(s) 320. The content driven automation system 145 may generate device control information (DCI) and send the DCI to the device 310. In some examples, the device 310 may receive the DCI over network 130. The device 310 may perform one or more actions to change the state of the device(s) 320. The device(s) 320 can, for example, include the lighting fixture 440. The lighting fixture 440 can provide attention grabbing lighting effects while content is being played using the device 110.

In some examples, the lighting fixture 440 can be configured by the device 310 to reflect when a program is starting, when a program is ending, when a program is going to commercial break, when an event occurs with respect to the program, or the like. The DCI may cause the lighting fixture 440 to turn on/off, blink, strobe, change color, hue, or intensity in response to real-time events occurring during playback of the content on the device 110.

In some examples, content driven automation system 145 determines lighting effect(s) (e.g., light color, intensity, hue, etc.) to be provided by, for example, the lighting fixture 440, based on dominant color(s) detected from the fingerprint 1202. In some examples, the content driven automation system 145 determines the dominant color(s) based on fingerprint data for one frame and/or for multiple frames (e.g., dominant color(s) for a block of frames, such as five frames). In examples in which the content driven automation system 145 determines the dominant color(s) based on multiple frames, the content driven automation system 145 can determine the dominant color(s) based on, for example, reoccurring dominant colors(s) detected between the frames, average(s) of color values in the frame(s), etc.

In some examples, the content driven automation system 145 uses image data (e.g., still image data) to detect one or more objects in the content and to determine the lighting effect(s) to be generated based on the object(s) and/or the color(s) of the object(s). For example, the content driven automation system 145 can detect, based on image data, that a dominant color in a background of a frame of the content is black. The content driven automation system 145 can detect that the same frame includes an object in the foreground having a lighter color (e.g., a candle). In such examples, the content driven automation system 145 can determine the lighting effect(s) to be provided by the example lighting fixture 440 based on the object(s) in the foreground (e.g., the candle) and/or characteristics of the object(s) (e.g., object color) rather than the dominant background color (e.g., black). Thus, in some examples, the content driven analyzer 145 selectively determines and/or adjusts the lighting effect(s) based on the fingerprint(s).

In some examples, the content driven automation system 145 may generate device control information (DCI) and send the DCI to the device 110 for controlling the device 310 and/or the device(s) 320. In some examples, the device 110 may receive the DCI over network 130. The device 110 may perform one or more actions to change the state of the device 310 and/or the device(s) 320.

In some examples, the device 310 and/or the device(s) 320 can pull the DCI from the content driven automation system 145. In one example, the device 310 may pull the DCI over network 130 at regular intervals. In another example, the device 310 may pull the DCI over network 130 in response to triggered events.

Figure 13:
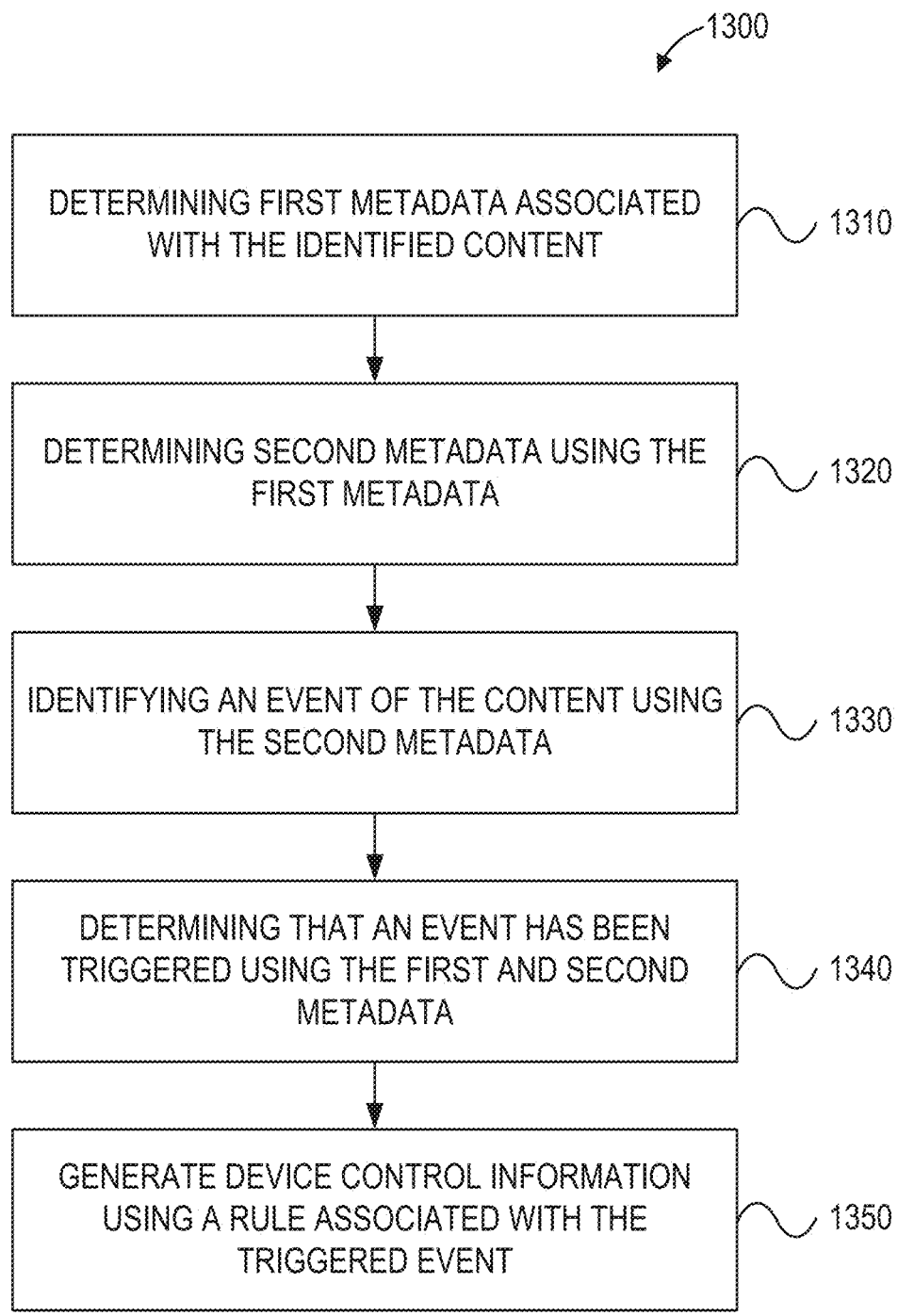
FIG. 13 is a flowchart representative of example machine readable instructions that may be executed to generate device control information using events for controlling one or more example devices during playback of content identified using digital fingerprint matching according to the teachings of this disclosure.

FIG. 13 is a flowchart representative of example machine readable instructions that may be executed to generate device control information using events for controlling one or more devices during playback of content identified using digital fingerprint matching, according to the teachings of this disclosure. The instructions 1300 may optionally be performed by the network environment 300 and, accordingly, are disclosed herein merely by way of example with reference thereto. It will be appreciated that the instructions 1300 may be executed by any suitable hardware.

In operation 1310, the content driven automation system 145 determines first metadata associated with the identified content. The first metadata refers to information directly associated with the identified content. This includes, for example, the title or name of the content, the publisher, the type, the format, etc., as well as optionally a representation of the content itself.

In operation 1320, the content driven automation system 145 determines second metadata associated with the identified content. The second metadata refers to information derived from the content or the first metadata. The second metadata can include, for example, information that expands the first metadata. Some examples of the second metadata can include mood information, reviews, curated descriptions and summaries, subtitles, closed captioning, supplemental language feeds, simulcast real-time data streams, and the like. One example of the second metadata can include music and video metadata provided by Gracenote of Emeryville, Calif.

In operation 1330, the content driven automation system 145 determines that an event has been triggered using the first and the second metadata. An event that has been triggered as used herein refers to an occurrence in the identified content or in related data of a predetermined piece of information. For example, an event may be triggered by the occurrence of one or more keywords in closed-captioning streams associated with the identified content. In another example, an event may be triggered by the occurrence of a commercial break. In yet another example, an event may be triggered when real-time sports data streams indicate a change in score or a player foul.

In operation 1350, the content driven automation system 145 generates device control information (DCI) using a rule associated with the triggered event. For example, the content driven automation system 145 may search user preferences and an event databased to determine one or more rules associated with the event. Each rule may define one or more conditions associated with the triggered event that when satisfied specify one or more actions, state changes, and/or resulting states in one or more devices. In some examples, a rule may be express as an "If This Then That" (IFTTT) chain of conditional statements. In some examples, a rule may be expressed as a user preference that forms part of a user profile for a user associated with the device 110. The generated DCI can include, for example, one or more instructions, commands, API calls, state representations, state changes, resulting states, or the like, that reflect any state change or resulting state indicated by a rule or user preference.

Figure 14:
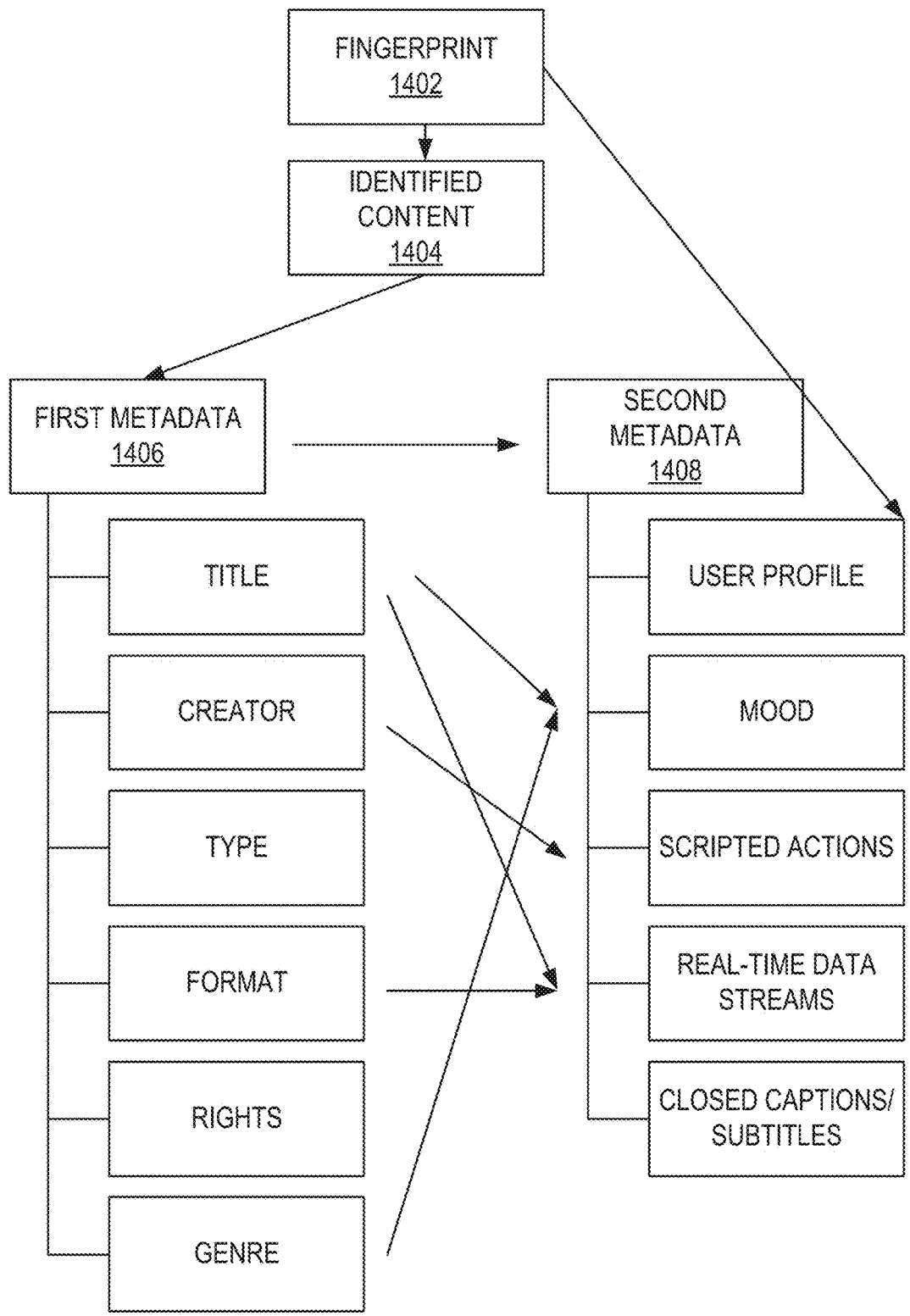
FIG. 14 is a block diagram illustrating example components of first metadata and second metadata that can be used to determine events for controlling one or more example devices during playback of content identified using digital fingerprint matching according to the teachings of this disclosure.

FIG. 14 is a block diagram illustrating example components of first metadata and second metadata used to determine events for controlling one or more devices during playback of content identified using digital fingerprint matching, according to the teachings of this disclosure. In some examples, a fingerprint 1402 is utilized to determine identified content 1404. The identified content 1404 is used to determine or otherwise obtain first metadata 1406. The first metadata 1406 is used to determine or otherwise obtain second metadata 1408. As illustrated in this example, the first metadata 1406 includes at least a title tag, a creator tag, a type tag, a format tag, a rights tag, and a genre tag. The second metadata 1408 in this example includes at least a user profile, a mood tag, one or more scripted actions, one or more real-time data streams, and one or more closed-captions/subtitles.

One or more portions of the first metadata 1406 can be used to determine or otherwise obtain one or more portions of the second metadata 1408. For example, the title tag and the genre tag can be used to determine the mood tag. In another example, the title tag and the format tag can be used to determine the one or more real-time data streams. The creator tag can be used to determine one or more scripted actions. A scripted action as used herein generally refers to a pre-recorded sequence of actions, state changes, resulting states, etc., that can be used with the identified content to enhance the playback experience. A content producer may create scripted actions for television episodes that change changes to lighting to invoke one or more feelings, provide additional on-screen information, drive automation of lighting or sound components, or the like.

Figure 15:
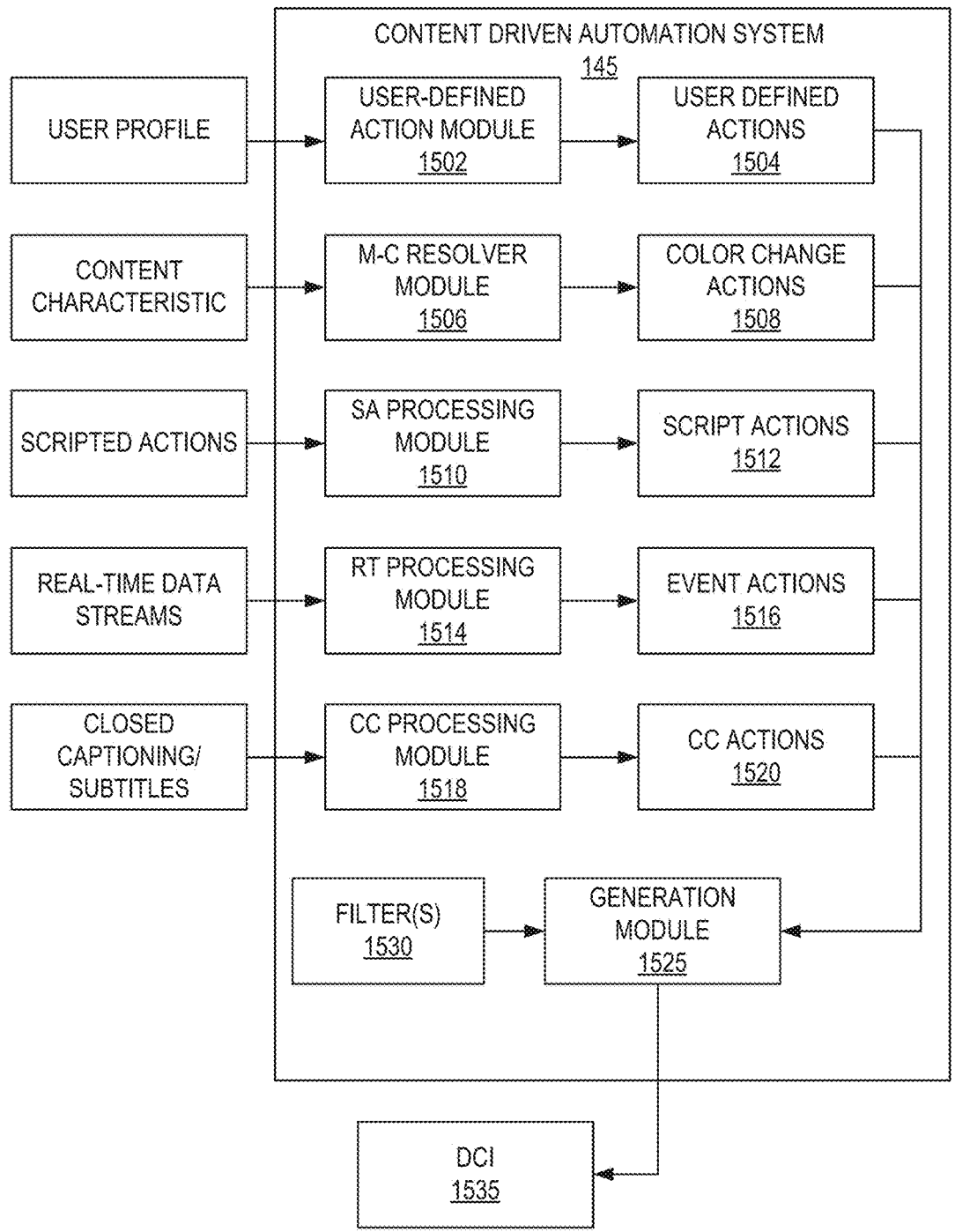
FIG. 15 is a block diagram illustrating example components of an example content driven automation system using a combination of metadata sources for controlling one or more devices during playback of content identified using digital fingerprint matching according to the teachings of this disclosure.

FIG. 15 is a block diagram illustrating example components of the content driven automation system 145 of FIG. 1 using a combination of metadata sources for controlling one or more devices during playback of content identified using digital fingerprint matching, according to the teachings of this disclosure. In this example, the content driven automation system 145 may include a user-defined action module 1502 that generates user-define actions 1504 in response to one or more user profile metadata. The user profile can include, for example, information about a user for which digital fingerprinting services are being performed. The user profile can also include, for example, personal identification information, accounting information, user preferences, user-defined mappings between content characteristics and device actions, user-define rules associated one or more events, or the like.

The content driven automation system 145 may include a mood-characteristic (M-C) resolver module 1506 that generates color change actions 1508 in response to one or more content characteristics metadata. The mood-characteristic (M-C) resolver module 1506 can resolve content characteristics, such as genre or mood, to one or more color changes. The content driven automation system 145 may include scripted actions (SA) parsing module 1510 that generates one or more scripted actions 1512 in response to scripted actions metadata. The SA parsing module 1510, for example, may determine whether one or more actions in the scripted actions metadata is applicable to the identified content, to a user, to a particular device, or the like.

The content driven automation system 145 may include an RT processing module 1514 that generates one or more event actions in response to real-time data streams metadata. The RT processing module 1514 may detect the triggering of one or more events and process a set of rules associated with the triggered event. The content driven automation system 145 may include a closed-captioning (CC) processing module that generates one or more closed-captioning actions in response to closed-captioning/subtitles metadata. The CC processing module 1518 may detect the occurrence of, for example, words, phrases, tags, signaling, or the like, within the closed-captioning/subtitles metadata that have corresponding device actions.

The content driven automation system 145 may include a generation module 1525 that collects the output actions of modules 1502, 1506, 1510, 1514, and 1518 to generate device control information (DCI). The generation module 1525 may engage with filter(s) 1530 to filter out, for example, unnecessary actions, conflicting actions, user-blocked actions, or the like. The generation module 1525 may output DCI 1535 that can be sent to a device or automation hub for action or further processing.

Figure 16:
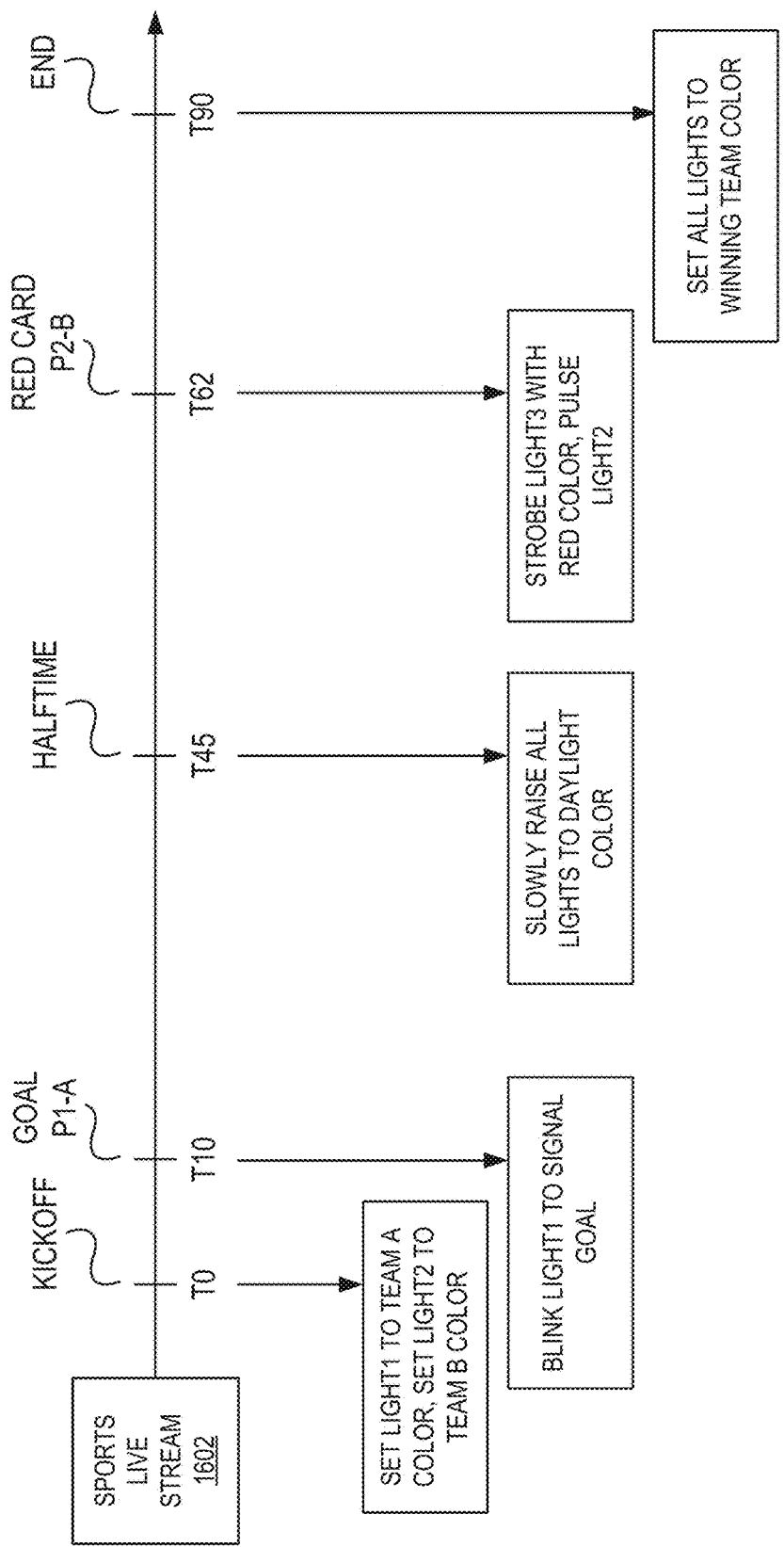
FIG. 16 is an example timeline diagram including example events and corresponding device control information and example machine readable instructions that may be executed to control one or more devices during playback of content identified using digital fingerprint matching according to teachings of this disclosure.

FIG. 16 is a timeline diagram including example events and corresponding device control information and example machine readable instructions that may be executed to control one or more devices during playback of content identified using digital fingerprint matching, according to the teachings of this disclosure. In this example, a sports live stream 1602 includes one or more events. Each event may be timestamped or time-based. As illustrated in this example, the sports live stream 1602 includes at least a kickoff event at time T0, a goal event by player 1 (P1) on team A at time T10, a halftime event at time T45, a foul event at time T62 indicating that player 2 (P2) on team B received a red card, and an end event at time T90.

As indicated above, the content driven automation system 145 may process the sports live stream 1602 in response to digital fingerprinting of the sports program when the sports program is being watched using the device 110. In response to the kickoff event at time T0, the content driven automation system 145 may set light 1 (LIGHT1) to the color associated with team A and set light 2 (LIGHT2) to the color associated with team B. In response to the goal event at time T10, the content driven automation system 145 may cause light 1, which is colored according to team A, to blink on and off to signal the goal by player 1 on team A. In response to the halftime event at time T45, the content driven automation system 145 may slowly raise the intensity, hue, and/or color of all lights to a daytime color to signal the pause in gameplay.

In response to the foul event at time T62, the content driven automation system 145 may strobe light 3 (LIGHT3) with a red color. The content driven automation system 145 may also pulse light 2 to indicate that a red card has been issued to a player on team B. In response to the end event at time T90, the content driven automation system 145 may set all lights to the color of the winning team.

In some examples, lighting effects can be controlled to run all the time or throughout a particular shows/music/events controlled by user using an app which may be running on a television and/or a mobile device.

While an example manner of implementing the example network environment 100, 300, 500 is illustrated in FIGS. 1-6, 12A, 12B, and/or 15 one or more of the elements, processes and/or devices illustrated in FIGS. 1-6, 12A, 12B, and/or 15 may be combined, divided, re-arranged, omitted, eliminated and/or implemented in any other way. Further, the example fingerprint generator 115, 125, the example content identification system 135, the example supplemental content database 140, the example content driven automation system 145, the example path selection module 210, the example value calculation module 220, the example index module 230, the example fingerprint match module 240, the example identification module 250, the example network controller 604, the example sound controller 606, the example media playback controller 608, the example cabin controller 610, the example dashboard controller 612, the example power seat controller 614, the example posture detector 616, the example robot seat controller 620, the example drive state monitor 622, the example user-defined action module 1502, the example M-C resolver module 1506, the example SA processing module 1510, the example RT processing module 1514, the example CC processing module 1518, the example generation module 1525 and/or, more generally, the network environment 100, 300, 500 may be implemented by hardware, software, firmware and/or any combination of hardware, software and/or firmware. Thus, for example, any of the example fingerprint generator 115, 125, the example content identification system 135, the example supplemental content database 140, the example content driven automation system 145, the example path selection module 210, the example value calculation module 220, the example index module 230, the example fingerprint match module 240, the example identification module 250, the example network controller 604, the example sound controller 606, the example media playback controller 608, the example cabin lighting controller 610, the example dashboard controller 612, the example power seat controller 614, the example posture detector 616, the example robot seat controller 620, the example drive state monitor 622, the example user-defined action module 1502, the example M-C resolver module 1506, the example SA processing module 1510, the example RT processing module 1514, the example CC processing module 1518, the example generation module 1525 and/or, more generally, the example network environment 100, 300, 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example fingerprint generator 115, 125, the example content identification system 135, the example supplemental content database 140, the example content driven automation system 145, the example path selection module 210, the example value calculation module 220, the example index module 230, the example fingerprint match module 240, the example identification module 250, the example network controller 604, the example sound controller 606, the example media playback controller 608, the example cabin lighting controller 610, the example dashboard controller 612, the example power seat controller 614, the example posture detector 616, the example robot seat controller 620, the example drive state monitor 622, the example user-defined action module 1502, the example M-C resolver module 1506, the example SA processing module 1510, the example RT processing module 1514, the example CC processing module 1518, and/or the example generation module 1525 is/are hereby expressly defined to include a non-transitory computer readable storage device or storage disk such as a memory, a digital versatile disk (DVD), a compact disk (CD), a Blu-ray disk, etc. including the software and/or firmware. Further still, the example network environment 100, 300, 500 may include one or more elements, processes and/or devices in addition to, or instead of, those illustrated in FIGS. 1-6, 12A, 12B, and/or 15, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The flowcharts of FIGS. 7-11, 13, and 16 are representative of example hardware logic or machine readable instructions for implementing the example systems of FIGS. 1-6, 12A, 12B, and/or 15. The machine readable instructions may be a program or portion of a program for execution by a processor such as the processor 1702 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1702, but the entire program and/or parts thereof could alternatively be executed by a device other than the processor 1702 and/or embodied in firmware or dedicated hardware. Further, although the example program is described with reference to the flowcharts illustrated in FIGS. 7-11, 13, and/or 16 many other methods of implementing the example systems of FIGS. 1-6, 12A, 12B, and/or 15 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7-11, 13, and/or 16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

F. Example Hardware System

Figure 17:
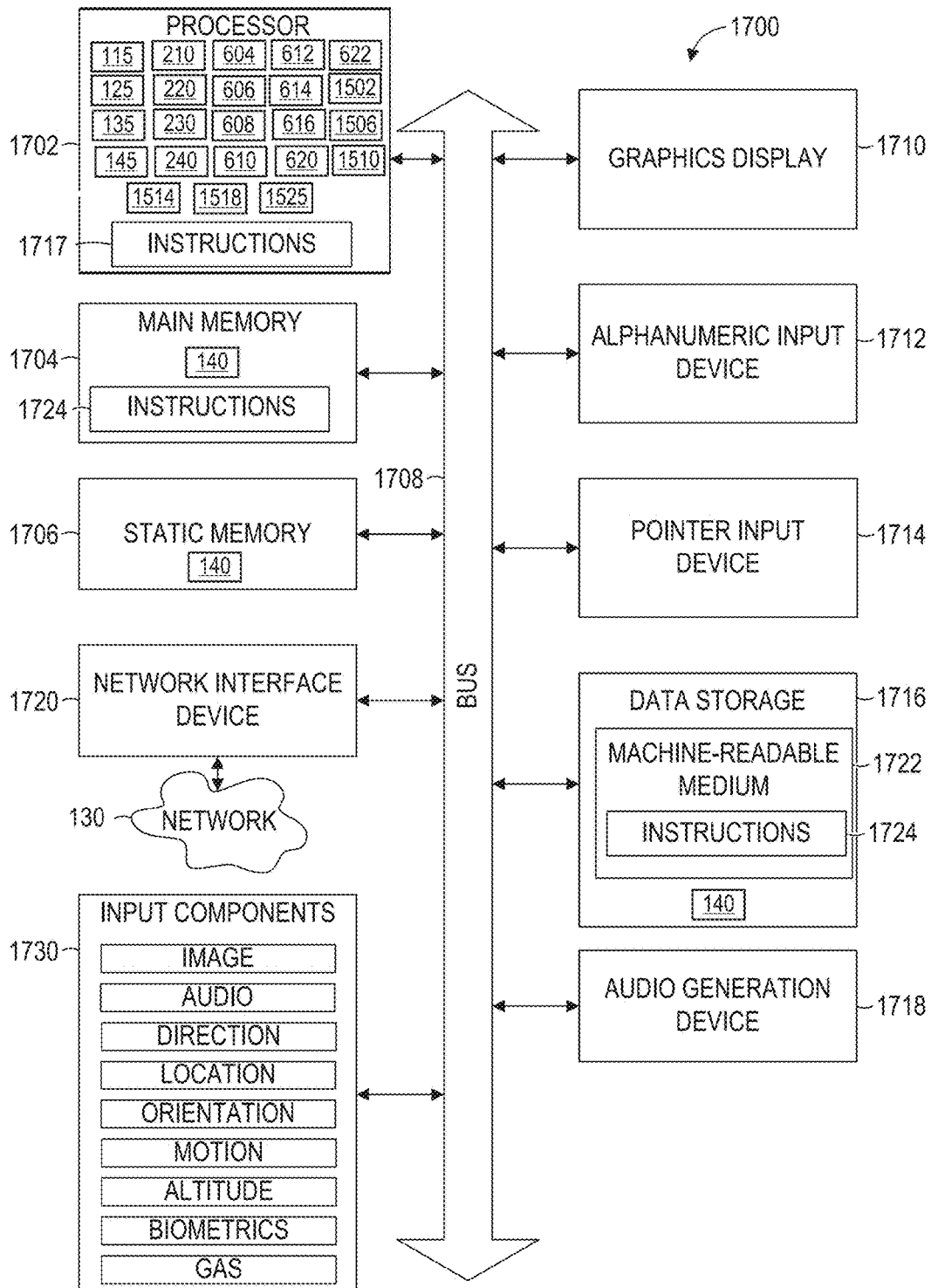
FIG. 17 is a block diagram of an example processing platform structured to execute the instructions of FIGS.

FIG. 17 is a block diagram illustrating components of an example machine 1700, according to the teachings of this disclosure, able to read instructions 1724 from a machine-readable medium 1722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 17 shows the machine 1700 in the example form of a computer system (e.g., a computer) within which the instructions 1724 (e.g., software, a program, an application, an applet, an app, or other executable code) for causing the machine 1700 to perform any one or more of the methodologies discussed herein may be executed, in whole or in part.

In some examples, the machine 1700 operates as a standalone device or may be communicatively coupled (e.g., networked) to other machines. In a networked deployment, the machine 1700 may operate in the capacity of a server machine or a client machine in a server-client network environment, or as a peer machine in a distributed (e.g., peer-to-peer) network environment. The machine 1700 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1724, sequentially or otherwise, that specify actions to be taken by that machine. Further, while only a single machine is illustrated, the term "machine" shall also be taken to include any collection of machines that individually or jointly execute the instructions 1724 to perform all or part of any one or more of the methodologies discussed herein.

The machine 1700 includes a processor 1702 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1704, and a static memory 1706, which are configured to communicate with each other via a bus 1708. The processor 1702 contains solid-state digital microcircuits (e.g., electronic, optical, or both) that are configurable, temporarily or permanently, by some or all of the instructions 1724 such that the processor 1702 is configurable to perform any one or more of the methodologies disclosed herein, in whole or in part. For example, a set of one or more microcircuits of the processor 1702 may be configurable to execute one or more modules (e.g., software modules) disclosed herein. In some examples, the processor 1702 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects disclosed herein may be provided by the machine 1700 with at least the processor 1702, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies disclosed herein. In this example, the processor 1702 implements the example fingerprint generator 115, 125, the example content identification system 135, the example content driven automation system 145, the example patch selection module 210, the example value calculation module 220, the example index module 230, the example fingerprint match module 240, the example identification module 250, the example network controller 604, the example sound controller 606, the example media playback controller 608, the example cabin lighting controller 610, the example dashboard controller 612, the example power seat controller 614, the example posture detector 616, the example robot seat controller 620, the example drive state monitor 622, the example user-defined action module 1502, the example M-C resolver module 1506, the example SA processing module 1510, the example RT processing module 1514, the example CC processing module 1518, and/or the example generation module 1525.

The machine 1700 may further include a graphics display 1710 (e.g., a plasma display panel (PDP), a light emitting diode (LED) display, a liquid crystal display (LCD), a projector, a cathode ray tube (CRT), or any other display capable of displaying graphics or video). The machine 1700 may also include an alphanumeric input device 1712 (e.g., a keyboard or keypad), a pointer input device 1714 (e.g., a mouse, a touchpad, a touchscreen, a trackball, a joystick, a stylus, a motion sensor, an eye tracking device, a data glove, or other pointing instrument), a data storage 1716, an audio generation device 1718 (e.g., a sound card, an amplifier, a speaker, a headphone jack, or any suitable combination thereof), and a network interface device 1720.

The data storage 1716 (e.g., a data storage device) includes the machine-readable medium 1722 (e.g., a tangible and non-transitory machine-readable storage medium) on which are stored the instructions 1724 embodying any one or more of the methodologies or functions disclosed herein. The instructions 1724 may also reside, completely or at least partially, within the main memory 1704, within the static memory 1706, within the processor 1702 (e.g., within the processor's cache memory), or any suitable combination thereof, before or during execution thereof by the machine 1700. Accordingly, the main memory 1704, the static memory 1706, and the processor 1702 may be considered machine-readable media (e.g., tangible and non-transitory machine-readable media). The instructions 1724 may be transmitted or received over the network 190 via the network interface device 1720. For example, the network interface device 1720 may communicate the instructions 1724 using any one or more transfer protocols (e.g., hypertext transfer protocol (HTTP)). Some or all of the supplemental content database 140 may be stored in the data storage 1716, the main memory 1704, and/or the static memory 1706.

In some examples, the machine 1700 may be a portable computing device (e.g., a vehicle device, a smart phone, a tablet computer, or a wearable device), and may have one or more additional input components 1730 (e.g., sensors or gauges). Examples of such input components 1730 (e.g., sensors) include an image input component (e.g., one or more cameras), an audio input component (e.g., one or more microphones), a direction input component (e.g., a compass), a location input component (e.g., a global positioning system (GPS) receiver), a velocity input component (e.g., speedometer), an orientation component (e.g., a gyroscope), a motion detection component (e.g., one or more accelerometers), an altitude detection component (e.g., an altimeter), a biometric input component (e.g., a force transducer, a pressure transducer, a blink detector, an eye movement tracker, a blood glucose level detector, a heart rate detector, a blood pressure detector, a galvanic skin response meter, an electroencephalogram generator, or an electrocardiogram generator), and a gas detection component (e.g., a gas sensor). Input data gathered by any one or more of these input components may be accessible and available for use by any of the modules disclosed herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1722 is shown in this example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1724 for execution by the machine 1700, such that the instructions 1724, when executed by one or more processors of the machine 1700 (e.g., processor 1702), cause the machine 1700 to perform any one or more of the methodologies disclosed herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some examples, the instructions 1724 for execution by the machine 1700 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1724).

Certain examples are disclosed herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In some examples, one or more computer systems or one or more hardware modules thereof may be configured by software (e.g., an application or portion thereof) as a hardware module that operates to perform operations disclosed herein for that module.

In some examples, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations disclosed herein. Furthermore, as used herein, the phrase "hardware-implemented module" refers to a hardware module. Considering examples in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the disclosed hardware modules may be regarded as being communicatively coupled. Where multiple hardware modules exist contemporaneously, communications may be achieved through signal transmission (e.g., over circuits and buses) between or among two or more of the hardware modules. In examples in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods disclosed herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions disclosed herein. As used herein, "processor-implemented module" refers to a hardware module in which the hardware includes one or more processors. Accordingly, the operations disclosed herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods disclosed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some examples, the one or more processors or hardware modules (e.g., processor-implemented modules) may be located in a single geographic location (e.g., within a home environment, an office environment, or a server farm). In some examples, the one or more processors or hardware modules may be distributed across a number of geographic locations.

Throughout this specification, plural instances may implement components, operations, or structures disclosed as a single instance. Although individual operations of one or more methods are illustrated and disclosed as separate operations, one or more of the individual operations may be performed concurrently, and nothing requires that the operations be performed in the order illustrated. Structures and their functionality disclosed as separate components and functions in example configurations may be implemented as a combined structure or component with combined functions. Similarly, structures and functionality disclosed as a single component may be implemented as separate components and functions. These and other variations, modifications, additions, and improvements fall within the scope of the subject matter herein.

Some portions of the subject matter discussed herein may be disclosed in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

From the foregoing, it will be appreciated that example apparatus methods, systems, and apparatus have been disclosed to provide lighting effect(s) via light-generating device(s) based on digital fingerprint data obtained from media content during playback of the media content. Some disclosed examples determine lighting effect(s) to be provided based on, for instance, event(s) occurring in the content and/or mood attribute(s) associated with the content. Some examples disclosed herein identify metadata associated with the content and analyze the content with respect to mood, content type, sequence of actions and/or events in the content, content subtitles, and/or other characteristics derived from the metadata. Some examples analyze, for instance, digital fingerprints of frame(s) of content such as video content to identify characteristics such as dominant colors in the frame(s). Based on the digital fingerprints and/or metadata, examples disclosed herein dynamically determine the lighting effect(s) (e.g., light color(s), intensity, blinking pattern(s), strobe effect(s), etc.) to be generated that supplement, complement, and/or enhance the content being played.

Examples disclosed herein efficiently communicate with content playback device(s) and light-generating device(s) to instruct the light-generating device(s) to provide mood-based lighting effect(s) in substantially real-time as the content is being played via the playback device(s). Rather than, for example, waiting for instructions from the content playback devices to provide the lighting effect(s) and/or only providing the lighting effect(s) when the content includes metadata directing lighting effect(s) to be generated, examples disclosed herein determine the lighting effect(s) to be provided based on digital fingerprinting and direct the light-generating device(s) to produce the lighting effect(s). Therefore, examples disclosed herein can be used to generate lighting effect(s) for a variety of content played via a variety of playback devices based an analysis of the content metadata. Thus, examples disclosed herein efficiently transform metadata indicative of, for example, mood associated with media content into lighting effects to be generated during presentation of the content to reflect content mood.

An example method disclosed herein includes receiving, by one or more processors of a machine, a fingerprint derived by a first device from a portion of content being played back on a first device; identifying, by one or more processors of the machine, the content using the fingerprint; determining, by one or more processors of the machine, a first action that controls a second device using metadata associated with the content; and controlling, by one or more processors of the machine, the second device using the first action during playback of the content on the first device.

An example method disclosed herein for controlling lighting effects during playback of content includes identifying, by one or more processors of a machine, content being played back on a video playback device using a fingerprint derived by the video playback device from a portion of the content; determining, by one or more processors of the machine, metadata associated with the identified content, the metadata indicative of one or more lighting effects provide by a light emitting device; and coordinating, by one or more processors of the machine, control of the light emitting device during playback of the content on the first device using the metadata and the one or more lighting effects.

Disclosed herein is a non-transitory machine-readable medium having a set of machine-executable instructions for controlling a first device during playback of content on a second device using digital fingerprinting as discussed herein.

Disclosed herein is a system for controlling a first device during playback of content on a second device using digital fingerprinting as discussed herein.

An apparatus disclosed herein includes a content identifier to identify content presented via a media presentation device based on a fingerprint associated with the content; and derive metadata from the identified content; and a content driven analyzer to: determine a light effect to be produced by a light-generating device based on the metadata; generate an instruction for the light-generating device to produce the light effect; and transmit the instruction to the light-generating device during presentation of the content.

In some examples, the content identifier is to identify the content by comparing the fingerprint to a plurality of fingerprints and identifying a match between the fingerprint and one of the fingerprints of the plurality of fingerprints.

In some examples, wherein the content is video content and the content identifier is to identify a dominant color of a frame of the video content based on the fingerprint.

In some example, the content driven analyzer is to determine the light effect based on the dominant color, the light effect to include a color of a light to be produced by the light-generating device based on the dominant color.

In some examples, the light effect includes a hue or an intensity of a light to be produced by the light-generating device.

In some examples, the metadata includes one or more of a mood tag, an event tag, title tag, or a genre tag, the content driven analyzer to determine the light effect based on the one or more tags.

In some examples, the content includes a first portion and a second portion, the first portion associated with a first mood tag and the second portion associated with a second mood tag, the content driven analyzer to determine respective light effects based on the first and second mood tags.

In some examples, the content driven analyzer is to direct the light-generating device to change from a first light effect to a second light effect based on the first and second mood tags via the instruction.

In some examples, the content driven analyzer is to determine a mood of the content based on the one or more of the title tag or the genre tag and to determine the light effect based on the mood of the content.

In some examples, the content driven analyzer is to determine the light effect to be produced by the light-generating device in a vehicle.

An example method disclosed herein includes identifying, by executing an instruction with the processor, metadata associated with content presented via a media presentation device; detecting, by executing an instruction with the processor, a characteristic of the content based on the metadata; determining, by executing an instruction with the processor, a lighting effect to be produced by a light-generating device in the environment in which the content is presented based on the characteristic; and transmitting, by executing an instruction with the processor, an instruction including the lighting effect to the light-generating device during presentation of the content.

In some examples, the characteristic is one of a mood associated with the content or an event occurring during presentation of the content.

In some examples, the characteristic is a first characteristic and the lighting effect is a first lighting effect, and further including detecting a second characteristic of the content based on the metadata and determining a second lighting effect to be produced by the light-generating device.

In some examples, the content is video content, the first lighting effect to be associated with a first frame of the video content or a first block of frames of the video content and the second lighting effect is associated with a second frame of the video content or a second block of frames of the video content.

In some examples, the method includes detecting a change in the characteristic of the content based on the metadata and generating an instruction including an adjusted lighting effect based on the change.

An example non-transitory machine readable storage medium disclosed herein includes instructions that, when executed, cause at least one machine to at least: identify content presented via a media presentation device based on a fingerprint associated with the content; derive metadata from the identified content; determine a light effect to be produced by a light-generating device based on the metadata; and direct the light-generating device to produce the light effect during presentation of the content.

In some examples, the instructions, when executed, further cause the machine to identify a dominant color of a portion of the content based on the fingerprint and determine the light effect based on the dominant color.

In some examples, the metadata includes one or more of a mood tag, an event tag, title tag, or a genre tag, and the instructions, when executed, cause the machine to determine the light effect based on the one or more tags.

In some examples, the content includes a first portion and a second portion, the first portion associated with a first mood tag and the second portion associated with a second mood tag, and the instructions, when executed, cause the machine to determine respective light effects based on the first and second mood tags.

An example system disclosed herein includes a controller to receive fingerprint data associated with media presented via a media playback device; identify a feature of the media based on the fingerprint data; and determine a light effect for the media based on the feature. The example system includes a light-generating device to: receive an instruction from the controller including the light effect; and produce the light effect during the presentation of the media.

In some examples, the controller is to identify the feature by identifying the media based on the fingerprint data and determining metadata for the media based on the identification of the media, the metadata including the feature.

In some examples, the feature is a first feature for a first portion of the media and the light effect is a first light effect for the first portion of the media and the controller is to: identify a second feature of a second portion of the media; and determine a second light effect to be produced by the light-generating device based on the second feature, the light-generating device to produce the second light effect during the presentation of the second portion of the media.

In some examples the second feature is an event occurring during the presentation of the media, the second feature to trigger the controller to transmit a second instruction including the second light effect to the light-generating device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a content identifier to identify a first event occurring during presentation of media content at a first time; and
a content driven analyzer to:
determine a first lighting effect to be produced by a light-producing device based on the first event; and
instruct the light-producing device to produce the first lighting effect based on the first event during presentation of the media content, the content identifier to identify a second media event occurring during presentation of the media content at a second time after the first time, the content driven analyzer to instruct the light-producing device to one of maintain the first lighting effect based on the second event or produce a second lighting effect based on the second event during presentation of the media content.

2. The apparatus of claim 1, wherein the content identifier is to:
identify the first event based on fingerprint associated with the media content; and
identify metadata associated with one or more of the first event or the media content, the content driven analyzer to determine the first lighting effect based on the metadata.

3. The apparatus of claim 1, wherein the metadata includes one or more of a mood tag, an event tag, or a genre tag.

4. The apparatus of claim 1, wherein the first lighting effect includes a first color of a light to be produced by the light-producing device and the second lighting effect includes a second color of the light.

5. The apparatus of claim 1, wherein the first lighting effect includes hue or an intensity of a light to be produced by the light-generating device.

6. The apparatus of claim 1, wherein the content identifier is to identify the second event based on a time stamp associated with the second event.

7. The apparatus of claim 1, wherein the content identifier is to identify the second event based on a fingerprint generated for the second event during the presentation of the media content.

8. A system comprising:
a controller to:
identify a feature of media content presented via a media playback device based on fingerprint data associated with the media content; and
determine a light effect for the media content based on the feature; and
a light-generating device to:
receive an instruction from the controller including the light effect; and
produce the light effect during the presentation of the media content.

9. The system of claim 8, wherein the controller is to identify the feature based on metadata associated with the media content.

10. The system of claim 8, wherein the content is video content and the controller is to identify a dominant color of a frame of the video content or a block of frames of the video content as the feature based on the fingerprint data.

11. The system of claim 10, wherein the lighting effect is to be associated with the frame or the block of frames of the video content.

12. The system of claim 8, wherein the feature is a first feature for a first portion of the media and the light effect is a first light effect for the first portion of the media and the controller is to:
- identify a second feature of a second portion of the media; and
- determine a second light effect to be produced by the light-generating device based on the second feature, the light-generating device to produce the second light effect during the presentation of the second portion of the media.

13. The system of claim 12, wherein the second feature is an event occurring during the presentation of the media, the second feature to trigger the controller to transmit a second instruction including the second light effect to the light-generating device.

14. The system of claim 8, wherein the light effect includes one or more of hue of a light to be produced by the light-generating device, an intensity of the light, blinking of the light, or strobing of the light.

15. A non-transitory machine readable storage medium comprising instructions that, when executed, cause at least one machine to at least:
- identify a first event occurring during presentation of media content at a first time;
- determine a first lighting effect to be produced by a light-producing device based on the first event; and
- instruct the light-producing device to produce the first lighting effect based on the first event during presentation of the media content;
- identify a second media event occurring during presentation of the media content at a second time after the first time; and
- instruct the light-producing device to one of maintain the first lighting effect based on the second event or produce a second lighting effect based on the second event during presentation of the media content.

16. The non-transitory machine readable storage medium of claim 15, wherein the instructions, when executed, further cause the at least one machine to
- identify the first event based on fingerprint associated with the media content;
- identify metadata associated with one or more of the first event or the media content; and
- determine the first lighting effect based on the metadata.

17. The non-transitory machine readable storage medium of claim 16, wherein the metadata includes one or more of a mood tag, an event tag, or a genre tag.

18. The non-transitory machine readable storage medium of claim 15, wherein the first lighting effect includes a first color of a light to be produced by the light-producing device and the second lighting effect includes a second color of the light.

19. The non-transitory machine readable storage medium of claim 15, wherein the first lighting effect includes hue or an intensity of a light to be produced by the light-generating device.

20. The non-transitory machine readable storage medium of claim 15, wherein the instructions, when executed, further cause the machine to identify the second event based on a time stamp associated with the second event.

* * * * *